United States Patent
Yan et al.

(10) Patent No.: US 10,390,302 B2
(45) Date of Patent: Aug. 20, 2019

(54) DATA SCHEDULING METHOD AND APPARATUS

(71) Applicant: Huawei Technologies Co., Ltd., Shenzhen (CN)

(72) Inventors: Zhiyu Yan, Beijing (CN); Bingyu Qu, Beijing (CN); Qiang Li, Shenzhen (CN); Chuanfeng He, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 147 days.

(21) Appl. No.: 15/346,557

(22) Filed: Nov. 8, 2016

(65) Prior Publication Data

US 2017/0055212 A1 Feb. 23, 2017

Related U.S. Application Data

(63) Continuation of application No. PCT/CN2014/083904, filed on Aug. 7, 2014.

(30) Foreign Application Priority Data

May 8, 2014 (WO) ................ PCT/CN2014/077079

(51) Int. Cl.
*H04W 52/02* (2009.01)
*H04W 72/12* (2009.01)

(52) U.S. Cl.
CPC ... *H04W 52/0216* (2013.01); *H04W 72/1268* (2013.01); *H04W 72/1284* (2013.01);
(Continued)

(58) Field of Classification Search
CPC ......... H04W 52/0216; H04W 72/1268; H04W 72/1284; Y02D 70/00; Y02D 70/1262; Y02D 70/1264; Y02D 70/24
See application file for complete search history.

(56) References Cited

U.S. PATENT DOCUMENTS

2006/0215662 A1 9/2006 Zhang et al.
2007/0097981 A1 5/2007 Papasakellariou
(Continued)

FOREIGN PATENT DOCUMENTS

CN 1411228 A 4/2003
CN 101202578 A 6/2008
(Continued)

OTHER PUBLICATIONS

"3$^{rd}$ Generation Partnership Project; Technical Specification Group Radio Access Network; Evolved Universal Terrestrial Radio Access (E-UTRA); User Equipment (UE) radio access capabilities (Release 12)," 3GPP TS 36.306, V12.0.0, pp. 1-29, 3$^{rd}$ Generation Partnership Project, Valbonne, France (Mar. 2014).

*Primary Examiner* — Asad M Nawaz
*Assistant Examiner* — Saad A. Waqas
(74) *Attorney, Agent, or Firm* — Leydig, Voit & Mayer, Ltd.

(57) ABSTRACT

The present invention relates to the field of communications technologies, and in particular, to a data scheduling method and apparatus, so as to resolve a problem that performing data scheduling on a data node by different evolved NodeBs participating in CA may cause a case in which a range supported by a processing capability of the data node is exceeded, or may cause a case in which the data node cannot fully leverage a processing capability of the data node. The method includes: sending, by the data node, scheduling limitation indication information to a first communications node; receiving, by the data node, data scheduling information that is sent by the first communications node to the data node; and sending, by the data node, uplink data to the first communications node, or receiving, by the data node, downlink data sent by the first communications node according to the data scheduling information.

15 Claims, 3 Drawing Sheets

(52) U.S. Cl.
CPC ...... *Y02D 70/1262* (2018.01); *Y02D 70/1264* (2018.01); *Y02D 70/24* (2018.01)

(56) References Cited

U.S. PATENT DOCUMENTS

| | | |
|---|---|---|
| 2010/0118815 A1 | 5/2010 | Kim et al. |
| 2010/0135208 A1 | 6/2010 | Ishii et al. |
| 2010/0272051 A1* | 10/2010 | Fu .................. H04L 5/0037 370/329 |
| 2011/0038261 A1 | 2/2011 | Carlström |
| 2011/0294491 A1* | 12/2011 | Fong .................. H04L 5/001 455/422.1 |
| 2015/0005027 A1 | 1/2015 | Zeng et al. |
| 2015/0117287 A1* | 4/2015 | Kim .................. H04W 52/0216 370/311 |
| 2016/0007284 A1* | 1/2016 | Futaki .................. H04W 48/12 370/311 |
| 2016/0285716 A1* | 9/2016 | Pelletier .................. H04L 5/0098 |
| 2016/0294531 A1* | 10/2016 | Loehr .................. H04W 72/0413 |

FOREIGN PATENT DOCUMENTS

| | | |
|---|---|---|
| CN | 101572904 A | 11/2009 |
| CN | 101690378 A | 3/2010 |
| CN | 102084628 A | 6/2011 |
| CN | 102523081 A | 6/2012 |
| CN | 103327595 A | 9/2013 |
| EP | 1892972 A1 | 2/2008 |
| EP | 2141938 A1 | 1/2010 |
| KR | 20100052064 A | 5/2010 |
| WO | WO 2013113390 A1 | 8/2013 |
| WO | WO 2013123980 A1 | 8/2013 |

\* cited by examiner

DATA SCHEDULING METHOD AND APPARATUS

CROSS-REFERENCE TO RELATED APPLICATIONS

This application is a continuation of International Application No. PCT/CN2014/083904, filed on Aug. 7, 2014, which claims priority to International Application No. PCT/CN2014/077079, filed on May 8, 2014. The disclosures of the aforementioned applications are hereby incorporated by reference in their entireties.

TECHNICAL FIELD

The present invention relates to the field of communications technologies, and in particular, to a data scheduling method and apparatus.

BACKGROUND

To meet a requirement, for a peak rate, of a Long Term Evolution Advanced (LTE-A) system, a carrier aggregation (CA) technology may be introduced in the LTE-A system. As shown in FIG. 1, FIG. 1 is a schematic diagram of performing carrier aggregation between evolved NodeBs. Evolved NodeBs participating in carrier aggregation may aggregate several continuous or discontinuous frequency bands (such as f1 or f2 in the figure) to jointly provide a service for user equipment (UE). In a process of providing the service for the user equipment, different evolved NodeBs participating in the carrier aggregation separately perform data scheduling on the user equipment.

When each evolved NodeB participating in the carrier aggregation performs data scheduling on the user equipment, a scheduling result may be determined based on a maximum processing capability of the user equipment, and data scheduling information may be sent to the user equipment. In this case, a total result of performing data scheduling by multiple evolved NodeBs on the user equipment may be possibly beyond a range supported by a processing capability of the user equipment, and consequently, the user equipment has to discard data that is beyond the range of the processing capability of the user equipment, which causes a data reception failure.

To avoid occurrence of the foregoing case, a preconfiguration manner is generally used. That is, a user equipment capability parameter used for communication between each evolved NodeB and the user equipment is determined in advance between the evolved NodeBs participating in the carrier aggregation. For example, communication load per transmission time interval (TTI) used for communication between each evolved NodeB and the user equipment is determined in advance, so that the communication load per TTI of the user equipment is not beyond the range supported by the processing capability of the user equipment.

Although the foregoing preconfiguration manner may avoid a problem that a total result of performing data scheduling by multiple evolved NodeBs on the user equipment is beyond the range supported by the processing capability of the user equipment, a service transmission quantity and a channel environment between each evolved NodeB and the user equipment change continuously, and use of this preconfiguration manner may cause a case in which the user equipment cannot fully leverage the processing capability of the user equipment in some periods of time, thereby affecting a throughput of the user equipment and reducing a peak rate.

In conclusion, when the different evolved NodeBs participating in the carrier aggregation perform data scheduling on the user equipment, a total result of performing data scheduling on the user equipment may be beyond the range supported by the processing capability of the user equipment, or possibly, the user equipment cannot fully leverage the processing capability of the user equipment.

SUMMARY

Embodiments of the present invention provide a data scheduling method and apparatus, so as to resolve a problem that performing data scheduling on user equipment by different evolved NodeBs participating in carrier aggregation may cause a case in which a range supported by a processing capability of the user equipment is exceeded, or may cause a case in which the user equipment cannot fully leverage a processing capability of the user equipment.

According to a first aspect, a data scheduling apparatus is provided, including:

a sending module, configured to send scheduling limitation indication information of a data node to a first communications node, where the scheduling limitation indication information is used to indicate limitation information used when the first communications node performs data scheduling on the data node;

a receiving module, configured to receive data scheduling information that is sent by the first communications node to the data node according to the scheduling limitation indication information; and a transmission module, configured to send uplink data to the first communications node or receive downlink data sent by the first communications node, according to the data scheduling information received by the receiving module.

By using the data scheduling apparatus, the sending module may send the scheduling limitation indication information to the first communications node, where the scheduling limitation indication information is used to indicate the limitation information used when the first communications node performs data scheduling on the data node. In this way, the first communications node may perform data scheduling on the data node according to the scheduling limitation indication information sent by the data node, which can make full use of a processing capability of the data node, and also ensure that a total result of scheduling performed on the data node is not beyond a range supported by the processing capability of the data node.

With reference to the first aspect, in a first possible implementation manner, the scheduling limitation indication information is used to indicate one or more types of the following information:

a period of time within which the data node is in a sleep state relative to a second communications node;

information about a requirement, for a processing capability, of the data node, indicated by a result of performing data scheduling by the second communications node on the data node;

information about a relationship between maximum processing capability information of the data node and the information about the requirement, for the processing capability, of the data node, indicated by the result of performing data scheduling by the second communications node on the data node;

information about a requirement, for a processing capability of the data node, indicated by a total result of performing data scheduling by the first communications node and the second communications node on the data node; or information about a relationship between the maximum processing capability information of the data node and the information about the requirement, for the processing capability of the data node, indicated by the total result of performing data scheduling by the first communications node and the second communications node on the data node.

With reference to the first possible implementation manner of the first aspect, in a second possible implementation manner, the scheduling limitation indication information is further used to indicate identifier information of the second communications node.

With reference to the first aspect, or the first or the second possible implementation manner of the first aspect, in a third possible implementation manner, the apparatus further includes:

a determining module, configured to: after it is determined that the current scheduling limitation indication information changes, determine updated scheduling limitation indication information; and the sending module is specifically configured to send, according to a channel resource that is preconfigured by the first communications node for the data node and that is used to send the scheduling limitation indication information, the updated scheduling limitation indication information determined by the determining module to the first communications node.

According to a second aspect, a data scheduling apparatus is provided, including:

a receiving module, configured to receive scheduling limitation indication information that is sent by a data node or a second communications code to a first communications node, where the scheduling limitation indication information is used to indicate limitation information used when the first communications node performs data scheduling on the data node;

a determining module, configured to determine, according to the scheduling limitation indication information received by the receiving module, data scheduling information of data scheduling performed on the data node; and a sending module, configured to send the data scheduling information determined by the determining module to the data node.

By using the data scheduling apparatus, the receiving module may receive the scheduling limitation indication information sent by the data node, where the scheduling limitation indication information is used to indicate the limitation information used when the first communications node performs data scheduling on the data node. In this way, the determining module may determine the data scheduling information according to the scheduling limitation indication information received by the receiving module, which can make full use of a processing capability of the data node, and also ensure that a total result of scheduling performed on the data node is not beyond a range supported by the processing capability of the data node.

With reference to the second aspect, in a first possible implementation manner, the scheduling limitation indication information is used to indicate one or more types of the following information:

a period of time within which the data node is in a sleep state relative to a second communications node;

information about a requirement, for a processing capability of the data node, indicated by a result of performing data scheduling by the second communications node on the data node;

information about a relationship between maximum processing capability information of the data node and the information about the requirement, for the processing capability of the data node, indicated by the result of performing data scheduling by the second communications node on the data node;

information about a requirement, for a processing capability of the data node, indicated by a total result of performing data scheduling by the first communications node and the second communications node on the data node; or information about a relationship between the maximum processing capability information of the data node and the information about the requirement, for the processing capability of the data node, indicated by the total result of performing data scheduling by the first communications node and the second communications node on the data node.

With reference to the second aspect or the first possible implementation manner of the second aspect, in a second possible implementation manner, the receiving module is specifically configured to:

detect, on a channel resource that is preconfigured for the data node and that is used to send the scheduling limitation indication information, the scheduling limitation indication information sent by the data node or the second communications node; or detect, on a resource of a preconfigured control element, the scheduling limitation indication information sent by the data node.

With reference to the first or the second possible implementation manner of the second aspect, in a third possible implementation manner, if the scheduling limitation indication information is used to indicate the information about the period of time within which the data node is in the sleep state relative to the second communications node, the determining module is specifically configured to determine the data scheduling information according to the information used to indicate the period of time within which the data node is in the sleep state relative to the second communications node, the maximum processing capability information of the data node, and information about a requirement for performing data transmission between the first communications node and the data node.

With reference to the third possible implementation manner of the second aspect, in a fourth possible implementation manner, the scheduling limitation indication information further includes identifier information used to indicate the second communications node;

the determining module is further configured to: if it is determined, according to the information used to indicate the identifier information, that in addition to the first communications node and the second communications node, at least one communications node that needs to perform data scheduling on the data node further exists, determine, according to the information about the period of time within which the data node is in the sleep state relative to the second communications node and the maximum processing capability information of the data node, information about a processing capability that can be supported by the data node if any communications node in the at least one communications node performs data scheduling on the data node; and the sending module is further configured to send, to the any communications node, the information that is determined by the determining module and that is used to indicate the processing capability that can be supported by the data node.

With reference to the first or the second possible implementation manner of the second aspect, in a fifth possible implementation manner, if the scheduling limitation indication information includes the information used to indicate the requirement, for the processing capability of the data node, indicated by the result of performing data scheduling by the second communications node on the data node, the determining module is specifically configured to: determine, according to the maximum processing capability information of the data node and the information used to indicate the requirement, for the processing capability of the data node, indicated by the result of performing data scheduling by the second communications node on the data node, information about a processing capability that can be supported by the data node if the first communications node performs data scheduling on the data node; and determine the data scheduling information according to the determined information about the processing capability that can be supported by the data node and information about a requirement for performing data transmission between the first communications node and the data node.

With reference to the fifth possible implementation manner of the second aspect, in a sixth possible implementation manner, the scheduling limitation indication information further includes identifier information used to indicate the second communications node;

the determining module is further configured to: if the first communications node determines, according to the information used to indicate the identifier information, that in addition to the first communications node and the second communications node, at least one communications node that needs to perform data scheduling on the data node further exists, determine, by the first communications node according to the maximum processing capability information of the data node and the information about the requirement, for the processing capability of the data node, indicated by the result of performing data scheduling by the second communications node on the data node, information about a processing capability that can be supported by the data node if any communications node in the at least one communications node performs data scheduling on the data node; and the sending module is further configured to send, to the any communications node, the information that is determined by the determining module and that is used to indicate the processing capability that can be supported by the data node if the any communications node in the at least one communications node performs data scheduling on the data node.

With reference to the first or the second possible implementation manner of the second aspect, in a seventh possible implementation manner, if the scheduling limitation indication information includes the information used to indicate the relationship between the maximum processing capability information of the data node and the information about the requirement, for the processing capability of the data node, indicated by the result of performing data scheduling by the second communications node on the data node, the determining module is specifically configured to: determine, according to the information used to indicate the relationship information, information about a processing capability that can be supported by the data node if the first communications node performs data scheduling on the data node; and determine the data scheduling information according to the determined information about the processing capability that can be supported by the data node and information about a requirement for performing data transmission between the first communications node and the data node.

With reference to the seventh possible implementation manner of the second aspect, in an eighth possible implementation manner, the scheduling limitation indication information further includes identifier information used to indicate the second communications node;

the determining module is further configured to: if the first communications node determines, according to the information used to indicate the identifier information, that in addition to the first communications node and the second communications node, at least one communications node that needs to perform data scheduling on the data node further exists, determine, by the first communications node according to the relationship information, information about a processing capability that can be supported by the data node if any communications node in the at least one communications node performs data scheduling on the data node; and the sending module is further configured to send, to the any communications node, the information that is determined by the determining module and that is used to indicate the processing capability that can be supported by the data node if the any communications node in the at least one communications node performs data scheduling on the data node.

With reference to the first or the second possible implementation manner of the second aspect, in a ninth possible implementation manner, if the scheduling limitation indication information includes the information used to indicate the requirement, for the processing capability of the data node, indicated by the total result of performing data scheduling by the first communications node and the second communications node on the data node, the determining module is specifically configured to: determine data scheduling adjustment information according to the maximum processing capability information of the data node and the information about the requirement, for the processing capability of the data node, indicated by the total result of performing data scheduling by the first communications node and the second communications node on the data node; and determine the data scheduling information according to the data scheduling adjustment information and information about a requirement for performing data transmission between the first communications node and the data node.

With reference to the first or the second possible implementation manner of the second aspect, in a tenth possible implementation manner, if the scheduling limitation indication information includes the information used to indicate the relationship between the maximum processing capability information of the data node and the information about the requirement, for the processing capability of the data node, indicated by the total result of performing data scheduling by the first communications node and the second communications node on the data node, the determining module is specifically configured to determine data scheduling adjustment information according to the relationship information, and determine the data scheduling information according to the data scheduling adjustment information and information about a requirement for performing data transmission between the first communications node and the data node.

With reference to the ninth or the tenth possible implementation manner of the second aspect, in an eleventh possible implementation manner, the determining module is specifically configured to determine, by the first communications node, data scheduling adjustment information for each communications node that needs to perform data scheduling on the data node; and the sending module is further configured to: for each communications node, except the first communications node, that needs to perform data scheduling on the data node, send the data scheduling adjustment information that is determined by the determining module and that is used to indicate the communications node to the communications node.

According to a third aspect, a data scheduling apparatus is provided, including a processor, a memory, and a bus, where the memory stores an execution instruction, and when the apparatus runs, the processor communicates with the memory by using the bus, and the processor executes the execution instruction, so that the apparatus executes the following method:

sending scheduling limitation indication information of a data node to a first communications node, where the scheduling limitation indication information is used to indicate limitation information used when the first communications node performs data scheduling on the data node;

receiving data scheduling information that is sent by the first communications node to the data node according to the scheduling limitation indication information; and sending uplink data to the first communications node or receiving downlink data sent by the first communications node, according to the data scheduling information.

By using the data scheduling apparatus, the processor may send the scheduling limitation indication information of the data node to the first communications node, where the scheduling limitation indication information is used to indicate the limitation information used when the first communications node performs data scheduling on the data node. In this way, the first communications node may perform data scheduling on the data node according to the scheduling limitation indication information of the data node, which can make full use of a processing capability of the data node, and also ensure that a total result of scheduling performed on the data node is not beyond a range supported by the processing capability of the data node.

With reference to the third aspect, in a first possible implementation manner, the scheduling limitation indication information includes indication information used to indicate one or more types of the following information:

a period of time within which the data node is in a sleep state relative to a second communications node;

information about a requirement, for a processing capability of the data node, indicated by a result of performing data scheduling by the second communications node on the data node;

information about a relationship between maximum processing capability information of the data node and the information about the requirement, for the processing capability of the data node, indicated by the result of performing data scheduling by the second communications node on the data node;

information about a requirement, for a processing capability of the data node, indicated by a total result of performing data scheduling by the first communications node and the second communications node on the data node; or information about a relationship between the maximum processing capability information of the data node and the information about the requirement, for the processing capability of the data node, indicated by the total result of performing data scheduling by the first communications node and the second communications node on the data node.

With reference to the first possible implementation manner of the third aspect, in a second possible implementation manner, the scheduling limitation indication information further includes identifier information used to indicate the second communications node.

With reference to the third aspect, or the first or the second possible implementation manner of the third aspect, in a third possible implementation manner, in the method executed by the processor, the sending scheduling limitation indication information to a first communications node includes:

after it is determined that the current scheduling limitation indication information changes, determining updated scheduling limitation indication information; and sending, according to a channel resource that is preconfigured by the first communications node for the data node and that is used to send the scheduling limitation indication information, the updated scheduling limitation indication information to the first communications node.

According to a fourth aspect, a data scheduling apparatus is provided, including a processor, a memory, and a bus, where the memory stores an execution instruction, and when the apparatus runs, the processor communicates with the memory by using the bus, and the processor executes the execution instruction, so that the apparatus executes the following method:

receiving scheduling limitation indication information that is sent by a data node to a first communications node, where the scheduling limitation indication information is used to indicate limitation information used when the first communications node performs data scheduling on the data node;

determining, according to the scheduling limitation indication information, data scheduling information of data scheduling performed on the data node; and sending the data scheduling information to the data node.

By using the data scheduling apparatus, the processor may receive the scheduling limitation indication information sent by the data node, where the scheduling limitation indication information is used to indicate the limitation information used when the first communications node performs data scheduling on the data node. In this way, the processor may perform data scheduling on the data node according to the scheduling limitation indication information of the data node, which can make full use of a processing capability of the data node, and also ensure that a total result of scheduling performed on the data node is not beyond a range supported by the processing capability of the data node.

With reference to the fourth aspect, in a first possible implementation manner, the scheduling limitation indication information includes indication information used to indicate one or more types of the following information:

a period of time within which the data node is in a sleep state relative to a second communications node;

information about a requirement, for a processing capability of the data node, indicated by a result of performing data scheduling by the second communications node on the data node;

information about a relationship between maximum processing capability information of the data node and the information about the requirement, for the processing capability of the data node, indicated by the result of performing data scheduling by the second communications node on the data node;

information about a requirement, for a processing capability of the data node, indicated by a total result of performing data scheduling by the first communications node and the second communications node on the data node; or information about a relationship between the maximum processing capability information of the data node and the information about the requirement, for the processing capability of the data node, indicated by the total result of performing data scheduling by the first communications node and the second communications node on the data node.

With reference to the fourth aspect or the first possible implementation manner of the fourth aspect, in a second possible implementation manner, in the method executed by the processor, the receiving scheduling limitation indication information that is sent by the data node to a first communications node includes: detecting, on a channel resource that is preconfigured for the data node and that is used to send the scheduling limitation indication information, the scheduling limitation indication information sent by the data node.

With reference to the first or the second possible implementation manner of the fourth aspect, in a third possible implementation manner, if the scheduling limitation indication information includes the information used to indicate the period of time within which the data node is in the sleep state relative to the second communications node, in the method executed by the processor, the determining, according to the scheduling limitation indication information, data scheduling information of data scheduling performed on the data node includes:

determining the data scheduling information according to the information about the period of time within which the data node is in the sleep state relative to the second communications node, the maximum processing capability information of the data node, and information about a requirement for performing data transmission between the first communications node and the data node.

With reference to the third possible implementation manner of the fourth aspect, in a fourth possible implementation manner, the scheduling limitation indication information further includes identifier information used to indicate the second communications node; and the method executed by the processor further includes:

if it is determined, according to the information used to indicate the identifier information, that in addition to the first communications node and the second communications node, at least one communications node that needs to perform data scheduling on the data node further exists, determining, according to the information about the period of time within which the data node is in the sleep state relative to the second communications node and the maximum processing capability information of the data node, information about a processing capability that can be supported by the data node if any communications node in the at least one communications node performs data scheduling on the data node; and sending, to the any communications node, the determined information that is used to indicate the processing capability that can be supported by the data node.

With reference to the first or the second possible implementation manner of the fourth aspect, in a fifth possible implementation manner, if the scheduling limitation indication information includes the information used to indicate the requirement, for the processing capability of the data node, indicated by the result of performing data scheduling by the second communications node on the data node, in the method executed by the processor, the determining, according to the scheduling limitation indication information, data scheduling information of data scheduling performed on the data node includes:

determining, according to the maximum processing capability information of the data node and the information used to indicate the requirement, for the processing capability of the data node, indicated by the result of performing data scheduling by the second communications node on the data node, information about a processing capability that can be supported by the data node if the first communications node performs data scheduling on the data node; and determining the data scheduling information according to the determined information about the processing capability that can be supported by the data node and information about a requirement for performing data transmission between the first communications node and the data node.

With reference to the fifth possible implementation manner of the fourth aspect, in a sixth possible implementation manner, the scheduling limitation indication information further includes identifier information used to indicate the second communications node; and the method executed by the processor further includes:

if it is determined, according to the information used to indicate the identifier information, that in addition to the first communications node and the second communications node, at least one communications node that needs to perform data scheduling on the data node further exists, determining, according to the maximum processing capability information of the data node and the information about the requirement, for the processing capability of the data node, indicated by the result of performing data scheduling by the second communications node on the data node, information about a processing capability that can be supported by the data node if any communications node in the at least one communications node performs data scheduling on the data node; and sending, to the any communications node, the determined information that is used to indicate the processing capability that can be supported by the data node if the any communications node in the at least one communications node performs data scheduling on the data node.

With reference to the first or the second possible implementation manner of the fourth aspect, in a seventh possible implementation manner, if the scheduling limitation indication information includes the information used to indicate the relationship between the maximum processing capability information of the data node and the information about the requirement, for the processing capability of the data node, indicated by the result of performing data scheduling by the second communications node on the data node, in the method executed by the processor, the determining, according to the scheduling limitation indication information, data scheduling information of data scheduling performed on the data node includes:

determining, according to the relationship information, information about a processing capability that can be supported by the data node if the first communications node performs data scheduling on the data node; and determining the data scheduling information according to the determined information about the processing capability that can be supported by the data node and information about a requirement for performing data transmission between the first communications node and the data node.

With reference to the seventh possible implementation manner of the fourth aspect, in an eighth possible implementation manner, the scheduling limitation indication information further includes identifier information used to indicate the second communications node; and the method executed by the processor further includes: if it is determined, according to the information used to indicate the identifier information, that in addition to the first communications node and the second communications node, at least one communications node that needs to perform data scheduling on the data node further exists, determining, according to the relationship information, information about a processing capability that can be supported by the data node if any communications node in the at least one communications node performs data scheduling on the data node; and sending, to the any communications node, the determined information that is used to indicate the processing capability that can be supported by the data node if the any communications node in the at least one communications node performs data scheduling on the data node.

With reference to the first or the second possible implementation manner of the fourth aspect, in a ninth possible implementation manner, if the scheduling limitation indication information includes the information used to indicate the requirement, for the processing capability of the data node, indicated by the total result of performing data scheduling by the first communications node and the second communications node on the data node, in the method executed by the processor, the determining, according to the scheduling limitation indication information, data scheduling information of data scheduling performed on the data node includes:

determining data scheduling adjustment information according to the maximum processing capability information of the data node and the information used to indicate the requirement, for the processing capability of the data node, indicated by the total result of performing data scheduling by the first communications node and the second communications node on the data node; and determining the data scheduling information according to the data scheduling adjustment information and information about a requirement for performing data transmission between the first communications node and the data node.

With reference to the first or the second possible implementation manner of the fourth aspect, in a tenth possible implementation manner, if the scheduling limitation indication information includes the information used to indicate the relationship between the maximum processing capability information of the data node and the information about the requirement, for the processing capability of the data node, indicated by the total result of performing data scheduling by the first communications node and the second communications node on the data node, in the method executed by the processor, the determining, according to the scheduling limitation indication information, data scheduling information of data scheduling performed on the data node includes:

determining data scheduling adjustment information according to the information used to indicate the relationship information; and determining the data scheduling information according to the data scheduling adjustment information and information about a requirement for performing data transmission between the first communications node and the data node.

With reference to the ninth or the tenth possible implementation manner of the fourth aspect, in an eleventh possible implementation manner, in the method executed by the processor, the determining the data scheduling adjustment information includes: determining the data scheduling adjustment information for each communications node that needs to perform data scheduling on the data node; and after the determining the data scheduling adjustment information, the method further includes:

for each communications node, except the first communications node, that needs to perform data scheduling on the data node, sending the determined data scheduling adjustment information that is used to indicate the communications node to the communications node.

According to a fifth aspect, a data scheduling method is provided, including:

sending, by a data node, scheduling limitation indication information to a first communications node, where the scheduling limitation indication information is used to indicate limitation information used when the first communications node performs data scheduling on the data node;

receiving, by the data node, data scheduling information that is sent by the first communications node to the data node according to the scheduling limitation indication information; and sending, by the data node according to the data scheduling information, uplink data to the first communications node, or receiving, by the data node according to the data scheduling information, downlink data sent by the first communications node.

With reference to the fifth aspect, in a first possible implementation manner, the scheduling limitation indication information includes indication information used to indicate one or more types of the following information:

a period of time within which the data node is in a sleep state relative to a second communications node;

information about a requirement, for a processing capability of the data node, indicated by a result of performing data scheduling by the second communications node on the data node;

information about a relationship between maximum processing capability information of the data node and the information about the requirement, for the processing capability of the data node, indicated by the result of performing data scheduling by the second communications node on the data node;

information about a requirement, for a processing capability of the data node, indicated by a total result of performing data scheduling by the first communications node and the second communications node on the data node; or information about a relationship between the maximum processing capability information of the data node and the information about the requirement, for the processing capability of the data node, indicated by the total result of performing data scheduling by the first communications node and the second communications node on the data node.

By using the data scheduling method, the data node may send the scheduling limitation indication information to the first communications node, where the scheduling limitation indication information is used to indicate the limitation information used when the first communications node performs data scheduling on the data node. In this way, the first communications node may perform data scheduling on the data node according to the scheduling limitation indication information sent by the data node, which can make full use of a processing capability of the data node, and also ensure that a total result of scheduling performed on the data node is not beyond a range supported by the processing capability of the data node.

With reference to the first possible implementation manner of the fifth aspect, in a second possible implementation manner, the scheduling limitation indication information further includes identifier information used to indicate the second communications node.

With reference to the fifth aspect, or the first or the second possible implementation manner of the fifth aspect, in a third possible implementation manner, the sending, by a data node, scheduling limitation indication information to a first communications node includes:

after it is determined that the current scheduling limitation indication information changes, determining, by the data node, updated scheduling limitation indication information; and sending, by the data node according to a channel resource that is preconfigured by the first communications node for the data node and that is used to send the scheduling limitation indication information, the updated scheduling limitation indication information to the first communications node.

According to a sixth aspect, a data scheduling method is provided, including:

receiving, by a first communications node, scheduling limitation indication information sent by a data node or a second communications node, where the scheduling limitation indication information is used to indicate limitation information used when the first communications node performs data scheduling on the data node;

determining, by the first communications node according to the scheduling limitation indication information, data scheduling information of data scheduling performed on the data node; and sending, by the first communications node, the data scheduling information to the data node.

By using the data scheduling method, the first communications node may receive the scheduling limitation indication information sent by the data node, where the scheduling limitation indication information is used to indicate the limitation information used when the first communications node performs data scheduling on the data node. In this way, the first communications node may perform data scheduling on the data node according to the received scheduling limitation indication information, which can make full use of a processing capability of the data node, and also ensure that a total result of scheduling performed on the data node is not beyond a range supported by the processing capability of the data node.

With reference to the sixth aspect, in a first possible implementation manner, the scheduling limitation indication information includes indication information used to indicate one or more types of the following information:

a period of time within which the data node is in a sleep state relative to a second communications node;

information about a requirement, for a processing capability of the data node, indicated by a result of performing data scheduling by the second communications node on the data node;

information about a relationship between maximum processing capability information of the data node and the information about the requirement, for the processing capability of the data node, indicated by the result of performing data scheduling by the second communications node on the data node;

information about a requirement, for a processing capability of the data node, indicated by a total result of performing data scheduling by the first communications node and the second communications node on the data node; or information about a relationship between the maximum processing capability information of the data node and the information about the requirement, for the processing capability of the data node, indicated by the total result of performing data scheduling by the first communications node and the second communications node on the data node.

With reference to the sixth aspect or the first possible implementation manner of the sixth aspect, in a second possible implementation manner, the receiving, by a first communications node, scheduling limitation indication information that is sent by the data node includes:

detecting, by the first communications node, on a channel resource that is preconfigured for the data node and that is used to send the scheduling limitation indication information, the scheduling limitation indication information sent by the data node.

With reference to the first or the second possible implementation manner of the sixth aspect, in a third possible implementation manner, if the scheduling limitation indication information includes the information used to indicate the period of time within which the data node is in the sleep state relative to the second communications node, the determining, by the first communications node according to the scheduling limitation indication information, data scheduling information of data scheduling performed on the data node includes:

determining, by the first communications node, the data scheduling information according to the information about the period of time within which the data node is in the sleep state relative to the second communications node, the maximum processing capability information of the data node, and information about a requirement for performing data transmission between the first communications node and the data node.

With reference to the third possible implementation manner of the sixth aspect, in a fourth possible implementation manner, the scheduling limitation indication information further includes identifier information used to indicate the second communications node; and the method further includes:

if the first communications node determines, according to the information used to indicate the identifier information, that in addition to the first communications node and the second communications node, at least one communications node that needs to perform data scheduling on the data node further exists, determining, by the first communications node according to the information about the period of time within which the data node is in the sleep state relative to the second communications node and the maximum processing capability information of the data node, information about a processing capability that can be supported by the data node if any communications node in the at least one communications node performs data scheduling on the data node; and sending, by the first communications node to the any communications node, the determined information that is used to indicate the processing capability that can be supported by the data node.

With reference to the first or the second possible implementation manner of the sixth aspect, in a fifth possible implementation manner, if the scheduling limitation indication information includes the information about the requirement, for the processing capability of the data node, indicated by the result of performing data scheduling by the second communications node on the data node, the determining, by the first communications node according to the scheduling limitation indication information, data scheduling information of data scheduling performed on the data node includes:

determining, by the first communications node according to the maximum processing capability information of the data node and the information used to indicate the requirement, for the processing capability of the data node, indicated by the result of performing data scheduling by the second communications node on the data node, information about a processing capability that can be supported by the data node if the first communications node performs data scheduling on the data node; and determining, by the first communications node, the data scheduling information according to the determined information about the processing capability that can be supported by the data node and information about a requirement for performing data transmission between the first communications node and the data node.

With reference to the fifth possible implementation manner of the sixth aspect, in a sixth possible implementation manner, the scheduling limitation indication information further includes identifier information used to indicate the second communications node; and the method further includes:

if the first communications node determines, according to the information used to indicate the identifier information, that in addition to the first communications node and the second communications node, at least one communications node that needs to perform data scheduling on the data node further exists, determining, by the first communications node according to the maximum processing capability information of the data node and the information about the requirement, for the processing capability of the data node, indicated by the result of performing data scheduling by the second communications node on the data node, information about a processing capability that can be supported by the data node if any communications node in the at least one communications node performs data scheduling on the data node; and sending, by the first communications node to the any communications node, the determined information that is used to indicate the processing capability that can be supported by the data node if the any communications node in the at least one communications node performs data scheduling on the data node.

With reference to the first or the second possible implementation manner of the sixth aspect, in a seventh possible implementation manner, if the scheduling limitation indication information includes the information used to indicate the relationship between the maximum processing capability information of the data node and the information about the requirement, for the processing capability of the data node, indicated by the result of performing data scheduling by the second communications node on the data node, the determining, by the first communications node according to the scheduling limitation indication information, data scheduling information of data scheduling performed on the data node includes:

determining, by the first communications node according to the relationship information, information about a processing capability that can be supported by the data node if the first communications node performs data scheduling on the data node; and determining, by the first communications node, the data scheduling information according to the determined information about the processing capability that can be supported by the data node and information about a requirement for performing data transmission between the first communications node and the data node.

With reference to the seventh possible implementation manner of the sixth aspect, in an eighth possible implementation manner, the scheduling limitation indication information further includes identifier information used to indicate the second communications node; and the method further includes: if the first communications node determines, according to the information used to indicate the identifier information, that in addition to the first communications node and the second communications node, at least one communications node that needs to perform data scheduling on the data node further exists, determining, by the first communications node according to the relationship information, information about a processing capability that can be supported by the data node if any communications node in the at least one communications node performs data scheduling on the data node; and sending, by the first communications node to the any communications node, the determined information that is used to indicate the processing capability that can be supported by the data node if the any communications node in the at least one communications node performs data scheduling on the data node.

With reference to the first or the second possible implementation manner of the sixth aspect, in a ninth possible implementation manner, if the scheduling limitation indication information includes the information used to indicate the requirement, for the processing capability of the data node, indicated by the total result of performing data scheduling by the first communications node and the second communications node on the data node, the determining, by the first communications node according to the scheduling limitation indication information, data scheduling information of data scheduling performed on the data node includes:

determining, by the first communications node, data scheduling adjustment information according to the maximum processing capability information of the data node and the information used to indicate the requirement, for the processing capability of the data node, indicated by the total result of performing data scheduling by the first communications node and the second communications node on the data node; and determining, by the first communications node, the data scheduling information according to the data scheduling adjustment information and information about a requirement for performing data transmission between the first communications node and the data node.

With reference to the first or the second possible implementation manner of the sixth aspect, in a tenth possible implementation manner, if the scheduling limitation indication information includes the information used to indicate the relationship between the maximum processing capability information of the data node and the information about the requirement, for the processing capability of the data node, indicated by the total result of performing data scheduling by the first communications node and the second communications node on the data node, the determining, by the first communications node according to the scheduling limitation indication information, data scheduling information of data scheduling performed on the data node includes:

determining, by the first communications node, data scheduling adjustment information according to the relationship information; and determining, by the first communications node, the data scheduling information according to the data scheduling adjustment information and information about a requirement for performing data transmission between the first communications node and the data node.

With reference to the ninth or the tenth possible implementation manner of the sixth aspect, in an eleventh possible implementation manner, the determining, by the first communications node, the data scheduling adjustment information includes:

determining, by the first communications node, the data scheduling adjustment information for each communications node that needs to perform data scheduling on the data node; and after the determining, by the first communications node, the data scheduling adjustment information, the method further includes:

for each communications node, except the first communications node, that needs to perform data scheduling on the data node, sending, by the first communications node, the determined data scheduling adjustment information that is used to indicate the communications node to the communications node.

BRIEF DESCRIPTION OF DRAWINGS

To describe the technical solutions in the embodiments of the present invention more clearly, the following briefly describes the accompanying drawings for describing the embodiments. The accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The described embodiments are some but not all of the embodiments of the present invention. All other embodiments obtained by persons of ordinary skill in the art based on the embodiments of the present invention without creative efforts shall fall within the protection scope of the present invention.

The following further describes the embodiments of the present invention in detail with reference to the accompanying drawings for this specification.

A data node in the embodiments of the present invention is a node used to receive data scheduling information, and to receive and/or send data based on the received data scheduling information. A communications node in the embodiments of the present invention (a first communications node, a second communications node, . . . , an $N^{th}$ communications node) is a node used to send the data scheduling information to the data node, and to receive the data sent by the data node or send the data to the data node. For example, in an LTE system, the communications node may be an evolved NodeB (eNB), and the data node may be user equipment (UE).

The following embodiments of the present invention first describe implementation of a data scheduling apparatus. Implementation of the data scheduling apparatus in the present invention is similar to implementation of a data scheduling method in the present invention. For specific implementation, refer to implementation of the data scheduling method described in a subsequent embodiment, and no repeated description is provided.

Figure 1:
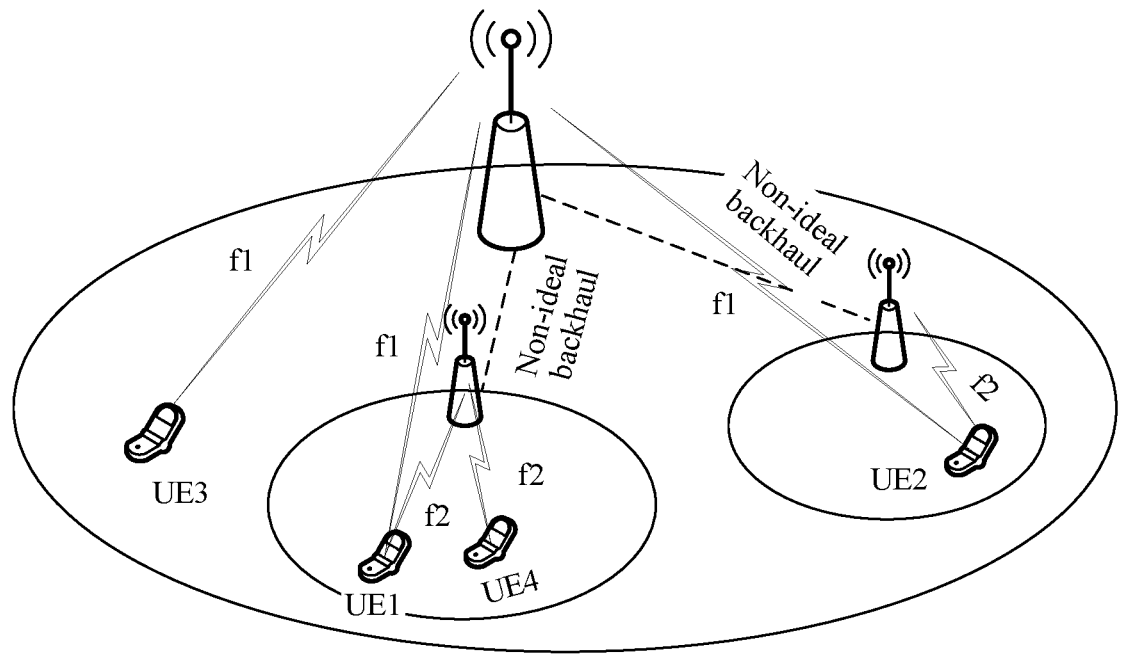
FIG. 1 is a schematic diagram of performing carrier aggregation between evolved NodeB s.
Figure 2:
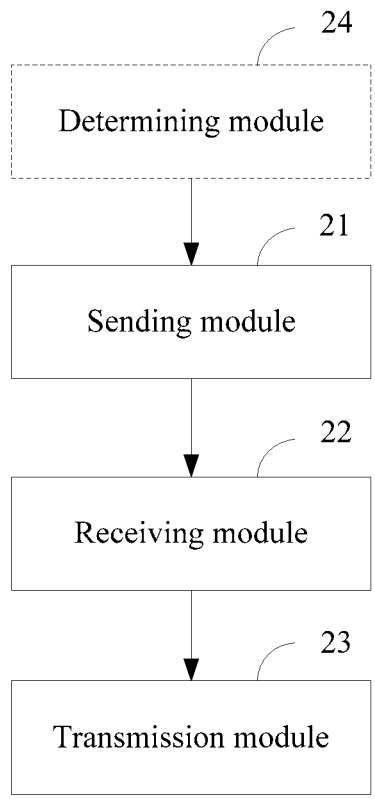
FIG. 2 is a schematic structural diagram of a data scheduling apparatus according to Embodiment 1 of the present invention.

As shown in FIG. 2, FIG. 2 is a schematic structural diagram of a data scheduling apparatus according to Embodiment 1 of the present invention. The apparatus includes:

a sending module 21, configured to send scheduling limitation indication information of a data node to a first communications node, where the scheduling limitation indication information is used to indicate limitation information used when the first communications node performs data scheduling on the data node;

a receiving module 22, configured to receive data scheduling information that is sent by the first communications node to the data node according to the scheduling limitation indication information; and a transmission module 23, configured to send uplink data to the first communications node or receive downlink data sent by the first communications node, according to the data scheduling information received by the receiving module 22.

Optionally, the scheduling limitation indication information includes indication information used to indicate one or more types of the following information:

a period of time within which the data node is in a sleep state relative to a second communications node;

information about a requirement, for a processing capability of the data node, indicated by a result of performing data scheduling by the second communications node on the data node;

information about a relationship between maximum processing capability information of the data node and the information about the requirement, for the processing capability of the data node, indicated by the result of performing data scheduling by the second communications node on the data node;

information about a requirement, for a processing capability of the data node, indicated by a total result of performing data scheduling by the first communications node and the second communications node on the data node; or information about a relationship between the maximum processing capability information of the data node and the information about the requirement, for the processing capability of the data node, indicated by the total result of performing data scheduling by the first communications node and the second communications node on the data node.

In an embodiment, the indication information of the period of time within which the data node is in the sleep state relative to the second communications node includes first indication information, and the first indication information is used to indicate a time at which the data node switches from a non-sleep state to the sleep state relative to the second communications node.

In another embodiment, in addition to the first indication information, the indication information of the period of time within which the data node is in the sleep state relative to the second communications node further includes second indication information, and the second indication information is used to indicate a time at which the data node switches from the sleep state to the non-sleep state relative to the second communications node.

In another embodiment, in addition to the first indication information, the indication information of the period of time within which the data node is in the sleep state relative to the second communications node further includes third indication information, and the third indication information is used to indicate whether the data node is within a long discontinuous reception (DRX) cycle or a short DRX cycle relative to the second communications node.

Optionally, the scheduling limitation indication information further includes identifier information used to indicate the second communications node.

Optionally, the apparatus further includes:

a determining module 24, configured to: after it is determined that the current scheduling limitation indication information changes, determine updated scheduling limitation indication information; and the sending module 21 is specifically configured to send, according to a channel resource that is preconfigured by the first communications node for the data node and that is used to send the scheduling limitation indication information, the updated scheduling limitation indication information determined by the determining module 24 to the first communications node.

Figure 3:
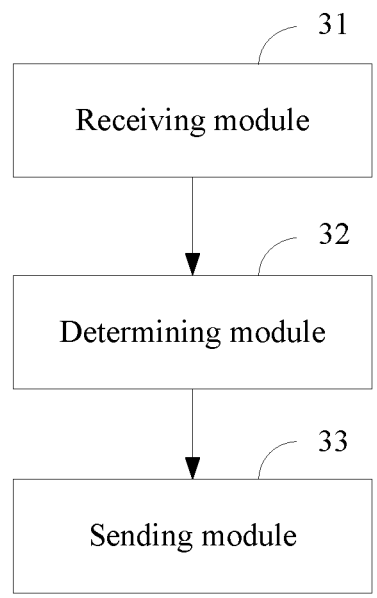
FIG. 3 is a schematic structural diagram of a data scheduling apparatus according to Embodiment 2 of the present invention.

As shown in FIG. 3, FIG. 3 is a schematic structural diagram of a data scheduling apparatus according to Embodiment 2 of the present invention. The apparatus includes:

a receiving module 31, configured to receive scheduling limitation indication information that is sent by a data node or a second communications node to a first communications node, where the scheduling limitation indication information is used to indicate limitation information used when the first communications node performs data scheduling on the data node;

a determining module 32, configured to determine, according to the scheduling limitation indication information received by the receiving module 31, data scheduling information of data scheduling performed on the data node; and a sending module 33, configured to send the data scheduling information determined by the determining module 32 to the data node.

Optionally, the scheduling limitation indication information includes indication information used to indicate one or more types of the following information:

a period of time within which the data node is in a sleep state relative to the second communications node;

information about a requirement, for a processing capability of the data node, indicated by a result of performing data scheduling by the second communications node on the data node;

information about a relationship between maximum processing capability information of the data node and the information about the requirement, for the processing capability of the data node, indicated by the result of performing data scheduling by the second communications node on the data node;

information about a requirement, for a processing capability of the data node, indicated by a total result of performing data scheduling by the first communications node and the second communications node on the data node; or information about a relationship between the maximum processing capability information of the data node and the information about the requirement, for the processing capability of the data node, indicated by the total result of performing data scheduling by the first communications node and the second communications node on the data node.

Optionally, the receiving module 31 is specifically configured to:

detect, on a channel resource that is preconfigured for the data node and that is used to send the scheduling limitation indication information, the scheduling limitation indication information sent by the data node or the second communications node; or detect, in a Medium Access Control Control Element (MAC CE) preconfigured for the data node, the scheduling limitation indication information sent by the data node or the second communications node.

Optionally, if the scheduling limitation indication information includes the information about the period of time within which the data node is in the sleep state relative to the second communications node, the determining module 32 is specifically configured to determine the data scheduling information according to the information about the period of time within which the data node is in the sleep state relative to the second communications node, the maximum processing capability information of the data node, and information about a requirement for performing data transmission between the first communications node and the data node.

In an embodiment, the indication information of the period of time within which the data node is in the sleep state relative to the second communications node includes first indication information, and the first indication information is used to indicate a time at which the data node switches from a non-sleep state to the sleep state relative to the second communications node; and the determining module 32 is specifically configured to determine, according to the first indication information, a start point of the period of time within which the data node is in the sleep state relative to the second communications node, and determine the data scheduling information according to the start point of the period of time within which the data node is in the sleep state relative to the second communications node, the maximum processing capability information of the data node, and the information about the requirement for performing data transmission between the first communications node and the data node.

In another embodiment, in addition to the first indication information, the indication information of the period of time within which the data node is in the sleep state relative to the second communications node further includes second indication information, and the second indication information is used to indicate a time at which the data node switches from the sleep state to the non-sleep state relative to the second communications node; and the determining module is specifically configured to:

determine, according to the first indication information and the second indication information, an end point of the period of time within which the data node is in the sleep state relative to the second communications node, and determine the data scheduling information according to the end point of the period of time within which the data node is in the sleep state relative to the second communications node, the maximum processing capability information of the data node, and the information about the requirement for performing data transmission between the first communications node and the data node.

In another embodiment, in addition to the first indication information, the indication information of the period of time within which the data node is in the sleep state relative to the second communications node further includes third indication information, and the third indication information is used to indicate whether the data node is within a long DRX cycle or a short DRX cycle relative to the second communications node; and the determining module is specifically configured to:

determine, according to the first indication information and the third indication information, an end point of the period of time within which the data node is in the sleep state relative to the second communications node, and determine the data scheduling information according to the end point of the period of time within which the data node is in the sleep state relative to the second communications node, the maximum processing capability information of the data node, and the information about the requirement for performing data transmission between the first communications node and the data node.

Optionally, the scheduling limitation indication information further includes identifier information used to indicate the second communications node;

the determining module 32 is further configured to: if it is determined, according to the information used to indicate the identifier information, that in addition to the first communications node and the second communications node, at least one communications node that needs to perform data scheduling on the data node further exists, determine, according to the information about the period of time within which the data node is in the sleep state relative to the second communications node and the maximum processing capability information of the data node, information about a processing capability that can be supported by the data node if any communications node in the at least one communications node performs data scheduling on the data node; and the sending module 33 is further configured to send, to the any communications node, the information that is determined by the determining module and that is about the processing capability that can be supported by the data node.

Optionally, if the scheduling limitation indication information includes the information used to indicate the requirement, for the processing capability of the data node, indicated by the result of performing data scheduling by the second communications node on the data node, the determining module 32 is specifically configured to: determine, according to the maximum processing capability information of the data node and the information about the requirement, for the processing capability of the data node, indicated by the result of performing data scheduling by the second communications node on the data node, information about a processing capability that can be supported by the data node if the first communications node performs data scheduling on the data node; and determine the data scheduling information according to the determined information about the processing capability that can be supported by the data node and information about a requirement for performing data transmission between the first communications node and the data node.

Optionally, the scheduling limitation indication information further includes identifier information used to indicate the second communications node;

the determining module 32 is further configured to: if the first communications node determines, according to the information used to indicate the identifier information, that in addition to the first communications node and the second communications node, at least one communications node that needs to perform data scheduling on the data node further exists, determine, by the first communications node according to the maximum processing capability information of the data node and the information about the requirement, for the processing capability of the data node, indicated by the result of performing data scheduling by the second communications node on the data node, information about a processing capability that can be supported by the data node if any communications node in the at least one communications node performs data scheduling on the data node; and the sending module 33 is further configured to send, to the any communications node, the information that is determined by the determining module 32 and that is about the processing capability that can be supported by the data node if the any communications node in the at least one communications node performs data scheduling on the data node.

Optionally, if the scheduling limitation indication information includes the information used to indicate the relationship between the maximum processing capability information of the data node and the information about the requirement, for the processing capability of the data node, indicated by the result of performing data scheduling by the second communications node on the data node, the determining module 32 is specifically configured to: determine, according to the relationship information, information about a processing capability that can be supported by the data node if the first communications node performs data scheduling on the data node; and determine the data scheduling information according to the determined information about the processing capability that can be supported by the data node and information about a requirement for performing data transmission between the first communications node and the data node.

Optionally, the scheduling limitation indication information further includes identifier information used to indicate the second communications node;

the determining module 32 is further configured to: if the first communications node determines, according to the information used to indicate the identifier information, that in addition to the first communications node and the second communications node, at least one communications node that needs to perform data scheduling on the data node further exists, determine, by the first communications node according to the relationship information, information about a processing capability that can be supported by the data node if any communications node in the at least one communications node performs data scheduling on the data node; and the sending module 33 is further configured to send, to the any communications node, the information that is determined by the determining module and that is used to indicate the processing capability that can be supported by the data node if the any communications node in the at least one communications node performs data scheduling on the data node.

Optionally, if the scheduling limitation indication information includes the information used to indicate the requirement, for the processing capability of the data node, indicated by the total result of performing data scheduling by the first communications node and the second communications node on the data node, the determining module 32 is specifically configured to: determine data scheduling adjustment information according to the maximum processing capability information of the data node and the information used to indicate the requirement, for the processing capability of the data node, indicated by the total result of performing data scheduling by the first communications node and the second communications node on the data node; and determine the data scheduling information according to the data scheduling adjustment information and information about a requirement for performing data transmission between the first communications node and the data node.

Optionally, if the scheduling limitation indication information includes the information used to indicate the relationship between the maximum processing capability information of the data node and the information about the requirement, for the processing capability of the data node, indicated by the total result of performing data scheduling by the first communications node and the second communications node on the data node, the determining module 32 is specifically configured to determine data scheduling adjustment information according to the relationship information, and determine the data scheduling information according to the data scheduling adjustment information and information about a requirement for performing data transmission between the first communications node and the data node.

Optionally, the determining module 32 is specifically configured to: determine, by the first communications node, data scheduling adjustment information for each communications node that needs to perform data scheduling on the data node; and the sending module 33 is further configured to: for each communications node, except the first communications node, that needs to perform data scheduling on the data node, send the data scheduling adjustment information that is determined by the determining module and that is used to indicate the communications node to the communications node.

Figure 4:
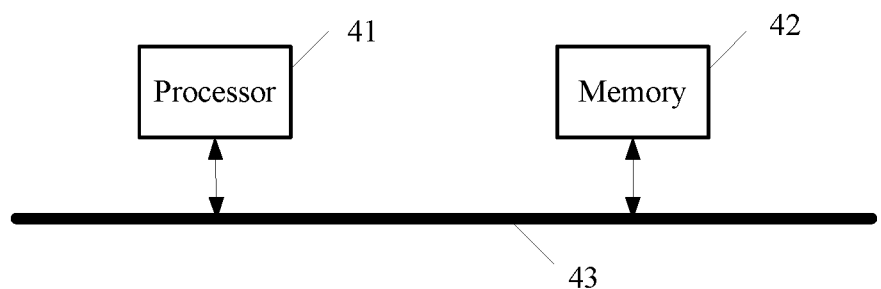
FIG. 4 is a schematic structural diagram of a data scheduling apparatus according to Embodiment 3 of the present invention.

As shown in FIG. 4, FIG. 4 is a schematic structural diagram of a data scheduling apparatus according to Embodiment 3 of the present invention. The apparatus includes a processor 41, a memory 42, and a bus 43, where the memory 42 stores an execution instruction, and when the apparatus runs, the processor 41 communicates with the memory 42 by using the bus 43, and the processor 41 executes the execution instruction, so that the apparatus executes the following method:

sending scheduling limitation indication information of a data node to a first communications node, where the scheduling limitation indication information is used to indicate limitation information used when the first communications node performs data scheduling on the data node;

receiving data scheduling information that is sent by the first communications node to the data node according to the scheduling limitation indication information; and sending uplink data to the first communications node or receiving downlink data sent by the first communications node, according to the data scheduling information.

Optionally, the scheduling limitation indication information includes indication information used to indicate one or more types of the following information:

a period of time within which the data node is in a sleep state relative to a second communications node;

information about a requirement, for a processing capability of the data node, indicated by a result of performing data scheduling by the second communications node on the data node;

information about a relationship between maximum processing capability information of the data node and the information about the requirement, for the processing capability of the data node, indicated by the result of performing data scheduling by the second communications node on the data node;

information about a requirement, for a processing capability of the data node, indicated by a total result of performing data scheduling by the first communications node and the second communications node on the data node; or information about a relationship between the maximum processing capability information of the data node and the information about the requirement, for the processing capability of the data node, indicated by the total result of performing data scheduling by the first communications node and the second communications node on the data node.

In an embodiment, the indication information of the period of time within which the data node is in the sleep state relative to the second communications node includes first indication information, and the first indication information is used to indicate a time at which the data node switches from a non-sleep state to the sleep state relative to the second communications node.

In another embodiment, in addition to the first indication information, the indication information of the period of time within which the data node is in the sleep state relative to the second communications node further includes second indication information, and the second indication information is used to indicate a time at which the data node switches from the sleep state to the non-sleep state relative to the second communications node.

In another embodiment, in addition to the first indication information, the indication information of the period of time within which the data node is in the sleep state relative to the second communications node further includes third indication information, and the third indication information is used to indicate whether the data node is within a long DRX cycle or a short DRX cycle relative to the second communications node.

Optionally, the scheduling limitation indication information further includes identifier information used to indicate the second communications node.

Optionally, in the method executed by the processor 41, the sending scheduling limitation indication information to a first communications node includes:

after it is determined that the current scheduling limitation indication information changes, determining updated scheduling limitation indication information; and sending, according to a channel resource that is preconfigured by the first communications node for the data node and that is used to send the scheduling limitation indication information, the updated scheduling limitation indication information to the first communications node; or sending, by the data node, in a MAC CE preconfigured for the first communications node and the data node, the updated scheduling limitation indication information to the first communications node.

Figure 5:
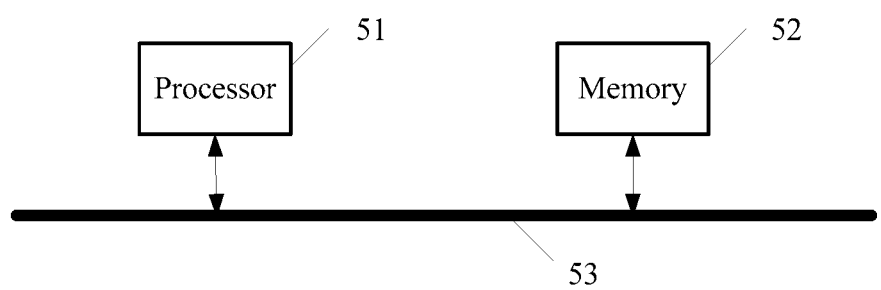
FIG. 5 is a schematic structural diagram of a data scheduling apparatus according to Embodiment 4 of the present invention.

As shown in FIG. 5, FIG. 5 is a schematic structural diagram of a data scheduling apparatus according to Embodiment 4 of the present invention. The apparatus includes a processor 51, a memory 52, and a bus 53, where the memory 52 stores an execution instruction, and when the apparatus runs, the processor 51 communicates with the memory 52 by using the bus 53, and the processor 51 executes the execution instruction, so that the apparatus executes the following method:

receiving scheduling limitation indication information that is sent by a data node or a second communications node to a first communications node, where the scheduling limitation indication information is used to indicate limitation information used when the first communications node performs data scheduling on the data node;

determining, according to the scheduling limitation indication information, data scheduling information of data scheduling performed on the data node; and sending the data scheduling information to the data node.

Optionally, the scheduling limitation indication information includes indication information used to indicate one or more types of the following information:

a period of time within which the data node is in a sleep state relative to a second communications node;

information about a requirement, for a processing capability of the data node, indicated by a result of performing data scheduling by the second communications node on the data node;

information about a relationship between maximum processing capability information of the data node and the information about the requirement, for the processing capability of the data node, indicated by the result of performing data scheduling by the second communications node on the data node;

information about a requirement, for a processing capability of the data node, indicated by a total result of performing data scheduling by the first communications node and the second communications node on the data node; or information about a relationship between the maximum processing capability information of the data node and the information about the requirement, for the processing capability of the data node, indicated by the total result of performing data scheduling by the first communications node and the second communications node on the data node.

Optionally, in the method executed by the processor 51, the receiving scheduling limitation indication information that is sent by the data node to a first communications node includes: detecting, on a channel resource that is preconfigured for the data node and that is used to send the scheduling limitation indication information, the scheduling limitation indication information sent by the data node; or detecting, in a MAC CE preconfigured for the first communications node and the data node, the scheduling limitation indication information sent by the data node; or detecting, in an information element preconfigured by the first communications node and the second communications node, the scheduling limitation indication information sent by the second communications node.

Optionally, if the scheduling limitation indication information includes the information used to indicate the period of time within which the data node is in the sleep state relative to the second communications node, in the method executed by the processor 51, the determining, according to the scheduling limitation indication information, data scheduling information of data scheduling performed on the data node includes:

determining the data scheduling information according to the information about the period of time within which the data node is in the sleep state relative to the second communications node, the maximum processing capability information of the data node, and information about a requirement for performing data transmission between the first communications node and the data node.

In an embodiment, the indication information of the period of time within which the data node is in the sleep state relative to the second communications node includes first indication information, and the first indication information is used to indicate a time at which the data node switches from a non-sleep state to the sleep state relative to the second communications node; and the determining, by the first communications node, the data scheduling information according to the information about the period of time within which the data node is in the sleep state relative to the second communications node, the maximum processing capability information of the data node, and information about a requirement for performing data transmission between the first communications node and the data node includes:

determining, according to the first indication information, a start point of the period of time within which the data node is in the sleep state relative to the second communications node, and determining the data scheduling information according to the start point of the period of time within which the data node is in the sleep state relative to the second communications node, the maximum processing capability information of the data node, and the information about the requirement for performing data transmission between the first communications node and the data node.

In another embodiment, in addition to the first indication information, the indication information of the period of time within which the data node is in the sleep state relative to the second communications node further includes second indication information, and the second indication information is used to indicate a time at which the data node switches from the sleep state to the non-sleep state relative to the second communications node; and the determining, by the first communications node, the data scheduling information according to the information about the period of time within which the data node is in the sleep state relative to the second communications node, the maximum processing capability information of the data node, and information about a requirement for performing data transmission between the first communications node and the data node includes:

determining, according to the first indication information and the second indication information, an end point of the period of time within which the data node is in the sleep state relative to the second communications node, and determining the data scheduling information according to the end point of the period of time within which the data node is in the sleep state relative to the second communications node, the maximum processing capability information of the data node, and the information about the requirement for performing data transmission between the first communications node and the data node.

In another embodiment, in addition to the first indication information, the indication information of the period of time within which the data node is in the sleep state relative to the second communications node further includes third indication information, and the third indication information is used to indicate whether the data node is within a long DRX cycle or a short DRX cycle relative to the second communications node; and the determining, by the first communications node, the data scheduling information according to the information about the period of time within which the data node is in the sleep state relative to the second communications node, the maximum processing capability information of the data node, and information about a requirement for performing data transmission between the first communications node and the data node includes:

determining, according to the first indication information and the third indication information, an end point of the period of time within which the data node is in the sleep state relative to the second communications node, and determining the data scheduling information according to the end point of the period of time within which the data node is in the sleep state relative to the second communications node, the maximum processing capability information of the data node, and the information about the requirement for performing data transmission between the first communications node and the data node.

Optionally, the scheduling limitation indication information further includes identifier information used to indicate the second communications node; and the method executed by the processor 51 further includes:

if it is determined, according to the information used to indicate the identifier information, that in addition to the first communications node and the second communications node, at least one communications node that needs to perform data scheduling on the data node further exists, determining, according to the information about the period of time within which the data node is in the sleep state relative to the second communications node and the maximum processing capability information of the data node, information about a processing capability that can be supported by the data node if any communications node in the at least one communications node performs data scheduling on the data node; and sending, to the any communications node, the determined information that is used to indicate the processing capability that can be supported by the data node.

Optionally, if the scheduling limitation indication information includes the information used to indicate the requirement, for the processing capability of the data node, indicated by the result of performing data scheduling by the second communications node on the data node, in the method executed by the processor 51, the determining, according to the scheduling limitation indication information, data scheduling information of data scheduling performed on the data node includes:

determining, according to the maximum processing capability information of the data node and the information about the requirement, for the processing capability of the data node, indicated by the result of performing data scheduling by the second communications node on the data node, information about a processing capability that can be supported by the data node if the first communications node performs data scheduling on the data node; and determining the data scheduling information according to the determined information about the processing capability that can be supported by the data node and information about a requirement for performing data transmission between the first communications node and the data node.

Optionally, the scheduling limitation indication information further includes identifier information used to indicate the second communications node; and the method executed by the processor 51 further includes:

if it is determined, according to the information used to indicate the identifier information, that in addition to the first communications node and the second communications node, at least one communications node that needs to perform data scheduling on the data node further exists, determining, according to the maximum processing capability information of the data node and the information about the requirement, for the processing capability of the data node, indicated by the result of performing data scheduling by the second communications node on the data node, information about a processing capability that can be supported by the data node if any communications node in the at least one communications node performs data scheduling on the data node; and sending, to the any communications node, the determined information that is used to indicate the processing capability that can be supported by the data node if the any communications node in the at least one communications node performs data scheduling on the data node.

Optionally, if the scheduling limitation indication information includes the information used to indicate the relationship between the maximum processing capability information of the data node and the information about the requirement, for the processing capability of the data node, indicated by the result of performing data scheduling by the second communications node on the data node, in the method executed by the processor 51, the determining, according to the scheduling limitation indication information, data scheduling information of data scheduling performed on the data node includes:

determining, according to the relationship information, information about a processing capability that can be supported by the data node if the first communications node performs data scheduling on the data node; and determining the data scheduling information according to the determined information about the processing capability that can be supported by the data node and information about a requirement for performing data transmission between the first communications node and the data node.

Optionally, the scheduling limitation indication information further includes identifier information used to indicate the second communications node; and the method executed by the processor 51 further includes:

if it is determined, according to the identifier information, that in addition to the first communications node and the second communications node, at least one communications node that needs to perform data scheduling on the data node further exists, determining, according to the relationship information, information about a processing capability that can be supported by the data node if any communications node in the at least one communications node performs data scheduling on the data node; and sending, to the any communications node, the determined information that is used to indicate the processing capability that can be supported by the data node if the any communications node in the at least one communications node performs data scheduling on the data node.

Optionally, if the scheduling limitation indication information includes the information used to indicate the requirement, for the processing capability of the data node, indicated by the total result of performing data scheduling by the first communications node and the second communications node on the data node, in the method executed by the processor 51, the determining, according to the scheduling limitation indication information, data scheduling information of data scheduling performed on the data node includes:

determining data scheduling adjustment information according to the maximum processing capability information of the data node and the information used to indicate the requirement, for the processing capability of the data node, indicated by the total result of performing data scheduling by the first communications node and the second communications node on the data node; and determining the data scheduling information according to the data scheduling adjustment information and information about a requirement for performing data transmission between the first communications node and the data node.

Optionally, if the scheduling limitation indication information includes the information used to indicate the relationship between the maximum processing capability information of the data node and the information about the requirement, for the processing capability of the data node, indicated by the total result of performing data scheduling by the first communications node and the second communications node on the data node, in the method executed by the processor 51, the determining, according to the scheduling limitation indication information, data scheduling information of data scheduling performed on the data node includes:

determining data scheduling adjustment information according to the relationship information; and determining the data scheduling information according to the data scheduling adjustment information and information about a requirement for performing data transmission between the first communications node and the data node.

Optionally, in the method executed by the processor 51, the determining the data scheduling adjustment information includes: determining the data scheduling adjustment information for each communications node that needs to perform data scheduling on the data node; and after the determining the data scheduling adjustment information, the method further includes:

for each communications node, except the first communications node, that needs to perform data scheduling on the data node, sending the determined data scheduling adjustment information that is used to indicate the communications node to the communications node.

Figure 6:
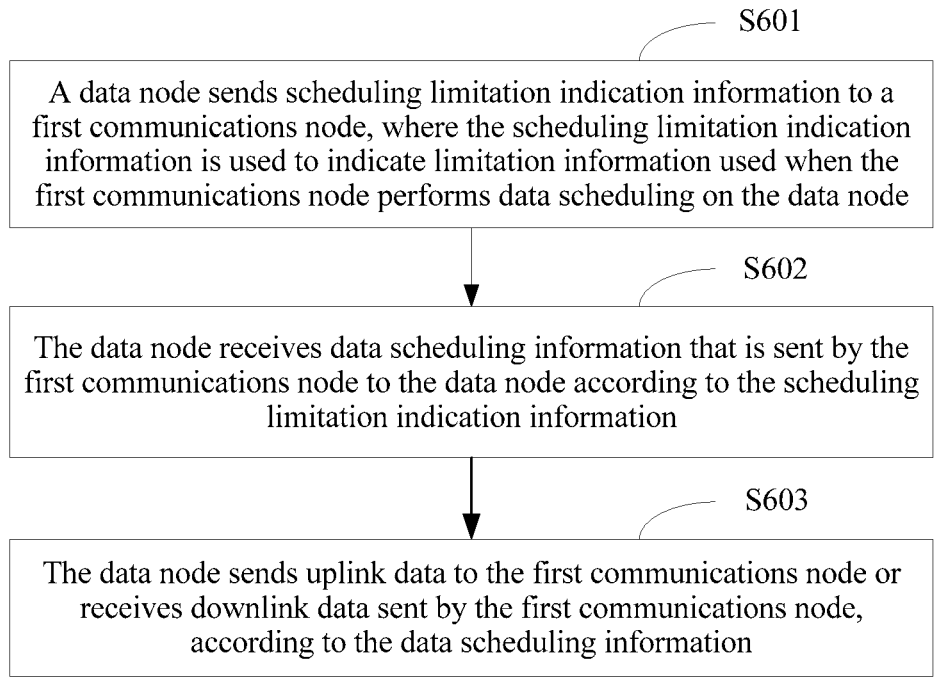
FIG. 6 is a flowchart of a data scheduling method according to Embodiment 5 of the present invention.

As shown in FIG. 6, FIG. 6 is a flowchart of a data scheduling method according to Embodiment 5 of the present invention. The method includes the following steps:

S601: A data node sends scheduling limitation indication information to a first communications node, where the scheduling limitation indication information is used to indicate limitation information used when the first communications node performs data scheduling on the data node.

In this step, the data node may send the scheduling limitation indication information to the first communications node, where the scheduling limitation indication information is used to indicate the limitation information used when the first communications node performs data scheduling on the data node. In this way, the first communications node may perform data scheduling on the data node according to the scheduling limitation indication information sent by the data node, which can make full use of a processing capability of the data node, and also ensure that a total result of scheduling performed on the data node is not beyond a range supported by the processing capability of the data node. Herein, the processing capability of the data node includes at least one of multiple pieces of information, such as a size of data received by the data node within a unit time, a size of data sent by the data node within a unit time, a size of received data stored by the data node within a unit time, a size of sent data stored by the data node within a unit time, transmit power of the data node within a unit time, a quantity of layers for performing spatial multiplexing, a quantity of aggregated carriers, or a quantity of soft channel bits (soft channel bits) available for hybrid automatic repeat processing.

S602: The data node receives data scheduling information that is sent by the first communications node to the data node according to the scheduling limitation indication information.

Herein, the first communications node determines, according to the scheduling limitation indication information sent by the data node and information about a requirement for performing data transmission between the first communications node and the data node, a result of performing data scheduling on the data node, and sends the data scheduling information to the data node. The data scheduling information herein includes a time-frequency resource, a spatial resource, a power resource, modulation and coding schemes, configuration information of a demodulation reference signal, and the like that are used for sending uplink data or receiving downlink data by the data node.

S603: The data node sends uplink data to the first communications node or receives downlink data sent by the first communications node, according to the data scheduling information.

Optionally, the sending, by a data node, scheduling limitation indication information to a first communications node includes:

after it is determined that the current scheduling limitation indication information changes, determining, by the data node, updated scheduling limitation indication information; and sending, by the data node according to a channel resource that is preconfigured by the first communications node for the data node and that is used to send the scheduling limitation indication information, the updated scheduling limitation indication information to the first communications node.

In specific implementation, the data node needs to feed back the current scheduling limitation indication information to the first communications node in real time. To enable the data node to conveniently feed back the scheduling limitation indication information, the first communications node may preconfigure a channel resource that is used by the data node to feed back the scheduling limitation indication information. The channel resource may be a periodic channel resource. After it is determined that the current scheduling limitation indication information changes, the data node feeds back the changed scheduling limitation indication information according to the channel resource preconfigured by the first communications node. The first communications node blindly detects, on the preconfigured channel resource, the scheduling limitation indication information sent by the data node, and after detecting the scheduling limitation indication information, updates stored scheduling limitation indication information of the data node, and performs data scheduling on the data node according to the updated scheduling limitation indication information.

Alternatively, the sending, by a data node, scheduling limitation indication information to a first communications node includes:

periodically sending, by the data node, the scheduling limitation indication information on the channel resource preconfigured by the first communications node.

Alternatively, the sending, by a data node, scheduling limitation indication information to a first communications node includes:

sending, by the data node, the scheduling limitation indication information in a control element predefined between the data node and the first communications node. For example, the scheduling limitation indication information changes by using the scheduling limitation indication information transmitted in a MAC CE (Medium Access Control Control Element) predefined between the data node and the first communications node.

Correspondingly, the first communications node periodically detects, on the preconfigured channel resource, the scheduling limitation indication information sent by the data node, and after detecting the scheduling limitation indication information, performs data scheduling on the data node according to the detected scheduling limitation indication information. Alternatively, the first communications node detects whether the scheduling limitation indication information exists in the control element predefined between the first communications node and the data node, and after detecting the scheduling limitation indication information, performs data scheduling on the data node according to the detected scheduling limitation indication information.

In specific implementation, limitation information used by the data node to instruct a communications node to perform data scheduling may be in multiple information forms. This embodiment of the present invention provides the following several information forms:

Form 1: The scheduling limitation indication information includes information used to indicate a period of time within which the data node is in a sleep state relative to a second communications node, and optionally, may further include identifier information used to indicate the second communications node.

In this implementation manner, the data node may determine, according to a discontinuous reception (DRX) cycle preconfigured by the second communications node for the data node, a timing time of each timer in a DRX mode, a result of performing data scheduling by the second communications node on the data node, and the like, the information about the period of time within which the data node is in the sleep state relative to the second communications node.

That is, factors that affect the period of time within which the data node is in the sleep state relative to the second communications node include a DRX cycle, a timing time of each timer in a DRX mode, a result of performing data scheduling by the second communications node on the data node, and the like. The result of performing data scheduling by the second communications node on the data node determines starting and expiration of the foregoing each timer. A timer in a DRX cycle includes an on duration timer (onDurationTimer), a DRX-inactivity timer (drx-InactivityTimer), a DRX-retransmission timer (drx-RetransmissionTimer), and a MAC-contention resolution timer (mac-ContentionResolutionTimer). A timing time of the on duration timer is a period of time within which the data node remains awake each time after waking up from DRX, and the data node searches for a physical downlink control channel (PDCCH) within the period of time. A timing time of the DRX-inactivity Timer is a period of time within which the data node remains in an active state each time after successfully decoding an initially transmitted PDCCH. A timing time of the DRX-retransmission Timer is a period of time within which the data node expects to receive downlink retransmission (DL Retransmission). A timing time of the MAC-contention resolution timer is a period of time within which the data node monitors a contention resolution message returned by an evolved NodeB.

The data node needs to be in the active state within the timing time of the foregoing each timer, and also needs to be in the active state in the following several cases:

The data node sends, to the second communications node, physical uplink control channel (PUCCH) that bears a scheduling request (SR), and the scheduling request is in a hold-on state. For a hold-on hybrid automatic repeat request (HARQ), the data node obtains an uplink grant, and stores corresponding HARQ buffer data. If the data node successfully receives a random access response message after sending a non-contention based random access request, the data node is in the active state before receiving a PDCCH that bears a data transmission instruction.

The second communications node may configure only a long DRX cycle for a data node, or configure two types of DRX cycles for a data node: a short DRX cycle and a long DRX cycle. The data node determines, according to a DRX cycle and a start point offset parameter, to start the on duration timer onDurationTimer, and determines timing, and the like of the DRX-inactivity timer, the DRX-retransmission timer, and the MAC-contention resolution timer according to a result of performing data scheduling by the second communications node on the data node and a data demodulation result of the data node. The data node determines, according to whether an SR of the data node is in a hold-on state, a timing value of each timer, and the like, a time at which the data node starts to switch from the non-sleep state to the sleep state in the DRX cycle, and determines that a time at which the data communications node switches from the sleep state to the non-sleep state in the DRX cycle is a time at which the DRX cycle ends. When two types of DRX cycles are configured for the data node, a length of a long DRX cycle is an integer multiple of a length of a short DRX cycle. Switchover between the short DRX cycle and the long DRX cycle is based on a timer or an instruction of an eNB. For the data node, if the DRX-inactivity timer expires or a DRX Command MAC control element command is received, the short DRX cycle is used, and a DRX short cycle timer is started or restarted. The timer is used to record a quantity of short DRX cycles, and after the drxShortCycleTimer timer expires, the long DRX cycle is used. That is, in a case in which the DRX-inactivity timer is not triggered (this data node is not scheduled) in short DRX cycles in consecutive units of the drxShortCycleTimer timer, the long DRX cycle is used at a start point of a next long DRX cycle. If the DRX-inactivity timer is started in the long DRX cycle, the long DRX cycle switches over to the short DRX cycle.

According to the discontinuous reception (DRX) cycle configured by the second communications node for the data node, the timing time of each timer in the DRX mode, the result of performing data scheduling by the second communications node on the data node, and the like, the period of time within which the data node is in the sleep state relative to the second communications node may be several discontinuous periods of time. A period of time within which the data node notifies the communications node that the data node is in the sleep state relative to the second communications node may be some periods of time in the several discontinuous periods of time, for example, after all timers expire, from a time at which the data node switches from the non-sleep state to the sleep state to a time at which the data node switches from the sleep state to the non-sleep state.

In an embodiment, the indication information of the period of time within which the data node is in the sleep state relative to the second communications node includes first indication information, and the first indication information is used to indicate a time at which the data node switches from the non-sleep state to the sleep state relative to the second communications node.

In another embodiment, in addition to the first indication information, the indication information of the period of time within which the data node is in the sleep state relative to the second communications node further includes second indication information, and the second indication information is used to indicate a time at which the data node switches from the sleep state to the non-sleep state relative to the second communications node.

In another embodiment, in addition to the first indication information, the indication information of the period of time within which the data node is in the sleep state relative to the second communications node further includes third indication information, and the third indication information is used to indicate whether the data node is within a long DRX cycle or a short DRX cycle relative to the second communications node.

In this implementation manner, the data node may notify, in the following manners, the communications node of the period of time within which the data node is in the sleep state relative to the second communications node:

Manner 1: The data node notifies, at a time at which a state of the data node that is in the sleep state or the non-sleep state relative to the second communications node changes, or at a later time, the communications node that a state of the data node is in the sleep state or in the non-sleep state relative to the second communications node. Alternatively, the data node notifies, at a time at which a state of the data node that is in the sleep state or the non-sleep state relative to the second communications node changes, or at a later time, the communications node that the state of the data node that is in the sleep state or the non-sleep state relative to the second communications node changes. The first communications node may determine, according to a time of receiving information that is used by the data node to indicate the period of time within which the data node is in the sleep state relative to the second communications node, the period of time within which the data node is in the sleep state relative to the second communications node.

For example, 1 and 0 are respectively used to indicate that the data node is in the sleep state and that the data node is in the non-sleep state relative to the second communications node. If the data node reports 1, it indicates that the data node starts to switch from the non-sleep state to the sleep state relative to the second communications node. If the data node reports 0, it indicates that the data node starts to switch from the sleep state to the non-sleep state relative to the second communications node. Alternatively, 1 and 0 are respectively used to indicate that the state of the data node that is in the sleep state or the non-sleep state relative to the second communications node changes and does not change. If the data node reports 1, it indicates that a state of the data node that is in the sleep state or the non-sleep state relative to the second communications node changes. If the data node reports 0, it indicates that the sleep state or the non-sleep state of the data node relative to the second communications node does not change. The data node notifies, at the time at which the state of the data node that is in the sleep state or the non-sleep state relative to the second communications node changes, or at the later time, the communications node whether the state of the data node that is in the sleep state or the non-sleep state relative to the second communications node changes. The first communications node may determine, according to the time of receiving the information that is used by the data node to indicate the period of time within which the data node is in the sleep state relative to the second communications node, the period of time within which the data node is in the sleep state relative to the second communications node.

Manner 2: In each DRX cycle, the data node notifies, at the time at which the data node switches from the non-sleep state to the sleep state relative to the second communications node or at the later time, the communications node that the data node starts to switch from the non-sleep state to the sleep state relative to the second communications node. However, the time at which the data node switches from the sleep state to the non-sleep state relative to the second communications node is by default a time at which the DRX cycle ends.

If the second communications node configures two types of DRX cycles for the data node, in addition to notifying the communications node that the data node starts to switch from the non-sleep state to the sleep state relative to the second communications node, the data node sends, to the communications node, information used to indicate the time at which the current DRX cycle ends. For example, information about whether the currently used DRX cycle is a long DRX cycle or a short DRX cycle is sent.

In a specific implementation process, after receiving information used to indicate the period of time within which the data node is in the sleep state relative to the second communications node, the first communications node determines the information about the period of time within which the data node is in the sleep state relative to the second communications node. Then, the data scheduling information may be determined according to the information about the period of time within which the data node is in the sleep state relative to the second communications node, maximum processing capability information of the data node, and information about a requirement for performing data transmission between the first communications node and the data node (the requirement information may include channel condition information, service load information, and the like).

According to the two different manners used for indicating the period of time within which the data node is in the sleep state relative to the second communications node, the first communications node may determine, in the following manners, the information about the period of time within which the data node is in the sleep state relative to the second communications node.

Manner 1: The first communications node receives the information that is sent by the data node and that is used to notify the communications node of the period of time within which the data node is in the sleep state relative to the second communications node. A time at which the data node sends the information is determined according to a time of receiving the information; whether the communications node is in the sleep state or in the non-sleep state relative to the second communications node is determined according to the information. If it is determined, by using the indication information, that the communications node switches from the non-sleep state to the sleep state relative to the second communications node, it is determined that a time at which the data node sends the indication information is a start point of the period of time within which the data node is in the sleep state relative to the second communications node. Then, if it is determined, by using the indication information, that the communications node switches from the sleep state to the non-sleep state relative to the second communications node, it is determined that the time at which the data node sends the indication information is an end point of the period of time within which the data node is in the sleep state relative to the second communications node. The period of time within which the data node is in the sleep state relative to the second communications node is determined accordingly.

Manner 2: The first communications node receives the information that is sent by the data node and that is used to notify the communications node of the period of time within which the data node is in the sleep state relative to the second communications node. A time at which the data node sends the information is determined according to a time of receiving the information; it is determined, according to the information, that the communications node switches from the non-sleep state to the sleep state relative to the second communications node. If it is determined, by using the indication information, that the communications node switches from the non-sleep state to the sleep state relative to the second communications node, it is determined that a time at which the data node sends the indication information is a start point of the period of time within which the data node is in the sleep state relative to the second communications node. In addition, an end point of a DRX cycle that is of the data node relative to the second communications node and to which the start point of the time belongs is determined as the end point of the period of time within which the data node is in the sleep state relative to the second communications node. The period of time within which the data node is in the sleep state relative to the second communications node is determined accordingly.

If the second communications node configures two types of DRX cycles for the data node, the first communications node determines, according to information used to indicate a time at which the current DRX cycle ends, the end point of the period of time within which the data node is in the sleep state relative to the second communications node. The period of time within which the data node is in the sleep state relative to the second communications node is determined accordingly.

Specifically, if in addition to the second communications node, the first communications node is the only communications node that serves the data node, within the period of time within which the data node is in the sleep state relative to the second communications node, the first communications node only needs to ensure that a result of performing data scheduling on the data node is not beyond a range supported by the maximum processing capability of the data node, and does not need to consider a requirement, of performing data scheduling by the second communications node on the data node, for a processing capability of the data node. If in addition to the second communications node, N communications nodes that include the first communications node and that serve the data node further exist, in addition to sending the period of time within which the data node is in the sleep state relative to the second communications node to the first communications node, the data node further needs to send the identifier information of the second communications node to the first communications node. The identifier information is used by the first communications node to determine a communications node, where the data node is in the sleep state relative to the communications node. Within the period of time within which the data node is in the sleep state relative to the second communications node, the first communications node may use, together with other N−1 communications nodes based on an agreement between communications nodes, a processing capability allocated in this period of time by the data node for communication between the second communications node and the data node. For example, if a maximum processing capability required by the result of performing data scheduling by the second communications node on the data node is C', within the period of time within which the data node is in the sleep state relative to the second communications node, each communications node, except the second communications node, in the N communications nodes that serve the data node may increase, by C'/N, an upper limit of the processing capability that is of the data node and that is required by a result of performing data scheduling on the data node by each communications node, except the second communications node, in the N communications nodes that serve the data node.

In this implementation manner, the first communications node may make full use of the processing capability of the data node within the period of time within which the data node is in the sleep state relative to the second communications node, and a throughput of the data node and a peak rate may be improved in comparison with those in a manner in which a processing capability of the data node is preconfigured between communications nodes. To further describe beneficial effects of the implementation manner, the following describes a disadvantage of other implementation manners by using an example.

It is assumed that the processing capability of the data node is preconfigured between communications nodes; for example, processing capabilities of the data node that are respectively preconfigured for the first communications node, and the second communications node are C1 and C2. The maximum processing capability of the data node C=C1+C2. In this way, within the period of time within which the data node is in the sleep state relative to the second communications node, when the first communications node performs data scheduling on the data node, a case in which a result of performing data scheduling on the data node is beyond a range supported by the processing capability C1 of the data node still needs to be avoided. This manner causes a waste of a processing capability of the data node.

In this embodiment of the present invention, the data node notifies the first communications node of the period of time within which the data node is in the sleep state relative to the second communications node. In specific implementation, alternatively, the second communications node may notify, by using an IE (information element) predefined between the second communications node and the first communications node, the first communications node of the period of time within which the data node is in the sleep state relative to the second communications node. However, because of non-ideal backhaul existing in data transmission between communications nodes, a transmission delay exists when the second communications node transmits data to the first communications node, and the period of time (for example, a timing time of each timer) within which the data node is in the sleep state relative to the second communications node is generally extremely short. Therefore, a manner in which communications nodes notify each other may not meet a requirement for real-time transmission of information.

Form 2: The scheduling limitation indication information includes information used to indicate a requirement, for the processing capability of the data node, indicated by the result of performing data scheduling by the second communications node on the data node, and optionally, may further include the identifier information used to indicate the second communications node.

In this implementation manner, the data node determines, according to the data scheduling information sent by the second communications node, information about a requirement for a processing capability of the data node when the second communications node transmits data with the data node. The requirement information may be a specific processing capability parameter value, or may be a processing capability level. Different processing capability levels correspond to different processing capability parameter value ranges.

After receiving the foregoing scheduling limitation indication information, specific steps of determining, by the first communications node according to the scheduling limitation indication information, data scheduling information of data scheduling performed on the data node are:

determining, by the first communications node according to the maximum processing capability information of the data node and the information about the requirement, for the processing capability of the data node, indicated by the result of performing data scheduling by the second communications node on the data node, information about a processing capability that can be supported by the data node if the first communications node performs data scheduling on the data node; and determining, by the first communications node, the data scheduling information according to the determined information about the processing capability that can be supported by the data node and information about a requirement for performing data transmission between the first communications node and the data node (the requirement information may include channel condition information, service load information, and the like).

For example, the maximum processing capability of the data node is C, and a processing capability that is of the data node and that is required by the result of performing data scheduling by the second communications node on the data node is $k*C$, where $k<1$; if in addition to the second communications node, the first communications node is the only communications node that serves the data node, when the first communications node subsequently performs data scheduling on the data node, a requirement that is of a scheduling result of the first communications node and that is for a processing capability of the data node does not exceed $(1-k)*C$. If in addition to the second communications node, N communications nodes that include the first communications node and that serve the data node further exist, in addition to sending, to the first communications node, the information about the requirement, for the processing capability of the data node, indicated by the result of performing data scheduling by the second communications node on the data node, the data node further needs to send the identifier information of the second communications node to the first communications node. The identifier information is used by the first communications node to determine a communications node corresponding to the information that is about the requirement for the processing capability and that is sent by the data node. A requirement that is of a total result of performing data scheduling by the N communications nodes on the data node and that is for a processing capability of the data node does not exceed $(1-k)*C$.

In this implementation manner, the first communications node may determine, according to the information about the processing capability that is of the data node and that is required by the result of performing data scheduling by the second communications node on the data node, the data scheduling information to be subsequently sent to the data node, thereby making full use of the processing capability of the data node as far as possible, and also avoiding a case in which a total result of performing data scheduling by the first communications node and the second communications node on the data node is beyond the range supported by the processing capability of the data node. A throughput of the data node and a peak rate may be improved in comparison with those in a manner in which a processing capability of the data node is preconfigured between communications nodes. To further describe beneficial effects of the implementation manner, the following describes a disadvantage of other implementation manners by using an example.

It is assumed that the processing capability of the data node is preconfigured between communications nodes; for example, processing capabilities of the data node that are respectively preconfigured for the first communications node, and the second communications node are C1 and C2. The maximum processing capability of the data node $C=C1+C2$. If at a moment, according to the information about the requirement for performing data transmission between the first communications node and the data node (the requirement information may include channel condition information, service load information, and the like), the first communications node may schedule, for the data node, data of a processing capability that is $C1+C2/2$. However, because of limitation of the preconfigured processing capability, the first communications node can schedule, for the data node, only data of a processing capability that is C2, and in this case, a requirement, for a processing capability of the data node, indicated by a result of performing data scheduling by the second communications node on the data node is only C2/3. In this way, a processing capability of the data node is not fully used consequently. If the implementation manner of this embodiment of the present invention is used based on this preconfiguration manner, the data node may notify the first communications node of a processing capability $k*C$ (less than a preconfigured processing capability $m*C$, where $k<m<1$) that is of the data node and that is required by the result of performing data scheduling by the second communications node on the data node. When performing data scheduling on the data node, the first communications node determines that a processing capability that may also be used and that is of the data node is $(1-k)*C$ instead of $(1-m)*C$. Therefore, it may be ensured that the result of performing data scheduling on the data node is not beyond the range supported by the processing capability of the data node, and a throughput of the data node and a peak rate may also be improved.

In this embodiment of the present invention, the data node notifies the first communications node of the information used to indicate the requirement, for the processing capability of the data node, indicated by the result of performing data scheduling by the second communications node on the data node. In specific implementation, alternatively, the second communications node may notify, by using an IE (information element) predefined between the second communications node and the first communications node, the first communications node of the information about the requirement for the processing capability of the data node. However, because of non-ideal backhaul existing in data transmission between communications nodes, a transmission delay exists when the second communications node transmits data to the first communications node, and the result of performing data scheduling by the second communications node on the data node dynamically changes. Therefore, a manner in which communications nodes notify each other may not meet a requirement for real-time transmission of information.

Form 3: If the scheduling limitation indication information includes information used to indicate a relationship between the maximum processing capability information of the data node and the information about the requirement, for the processing capability of the data node, indicated by the result of performing data scheduling by the second communications node on the data node, and optionally, may further include the identifier information used to indicate the second communications node.

In this implementation manner, the data node determines, according to the data scheduling information sent by the second communications node, a requirement for a processing capability of the data node when the second communications node transmits data with the data node, and determines the information about the relationship between the requirement information and the maximum processing capability of the data node. The relationship information may be information about a remaining processing capability obtained by deducting a processing capability that is of the data node and that is required by the result of performing data scheduling by the second communications node on the data node from a maximum processing capability allocated by the data node on the second communications node.

After the data node sends the relationship information to the first communications node, the first communications node may directly determine, according to the relationship information, information about a processing capability that can be supported by the data node if the first communications node performs data scheduling on the data node; and determine the data scheduling information according to the determined information about the processing capability that can be supported by the data node and information about a requirement for performing data transmission between the first communications node and the data node (the requirement information may include channel condition information, service load information, and the like).

For example, the maximum processing capability of the data node is C, the processing capability that is of the data node and that is required by the result of performing data scheduling by the second communications node on the data node is k*C, and the data node determines that a remaining processing capability of the data node is (1−k)*C, and notifies the first communications node of the processing capability. If in addition to the second communications node, the first communications node is the only communications node that serves the data node, when the first communications node subsequently performs data scheduling on the data node, a requirement that is of a scheduling result of the first communications node and that is for a processing capability of the data node does not exceed (1−k)*C. If in addition to the second communications node, N communications nodes that include the first communications node and that serve the data node further exist, in addition to sending, to the first communications node, the information about the relationship between the maximum processing capability information of the data node and the information about the requirement, for the processing capability of the data node, indicated by the result of performing data scheduling by the second communications node on the data node, the data node further needs to send the identifier information of the second communications node to the first communications node. The identifier information is used by the first communications node to determine a communications node corresponding to the relationship information. A requirement that is of a total result of performing data scheduling by the N communications nodes on the data node and that is for a processing capability of the data node does not exceed (1−k)*C.

In this implementation manner, the first communications node may determine, according to information about a relationship between the maximum processing capability of the data node and the processing capability that is of the data node and that is required by the result of performing data scheduling by the second communications node on the data node, the data scheduling information to be subsequently sent to the data node, thereby making full use of the processing capability of the data node as far as possible, and also avoiding a case in which a total result of performing data scheduling by the first communications node and the second communications node on the data node is beyond the range supported by the processing capability of the data node. A throughput of the data node and a peak rate may be improved in comparison with those in a manner in which a processing capability of the data node is preconfigured between communications nodes.

In this embodiment of the present invention, the data node notifies the first communications node of the information used to indicate the relationship information. In specific implementation, alternatively, the second communications node may notify, by using an IE (information element) predefined between the second communications node and the first communications node, the first communications node of the relationship information. However, because of non-ideal backhaul existing in data transmission between communications nodes, a transmission delay exists when the second communications node transmits data to the first communications node, and the result of performing data scheduling by the second communications node on the data node dynamically changes. Therefore, a manner in which communications nodes notify each other may not meet a requirement for real-time transmission of information.

Form 4: The scheduling limitation indication information includes information used to indicate a requirement, for a processing capability of the data node, indicated by a total result of performing data scheduling by the first communications node and the second communications node on the data node.

In this implementation manner, the data node determines, according to the data scheduling information sent by the first communications node and the second communications node, information about a total requirement for a processing capability of the data node when data transmission is performed between the data node and either of the first communications node and the second communications node. The total requirement information may be a specific processing capability parameter value, or may be a processing capability level. Different processing capability levels correspond to different processing capability parameter value ranges. The data node sends the total requirement information to the first communications node, and the first communications node determines, according to the total requirement information, data scheduling adjustment information used when data scheduling is subsequently performed on the data node; that is, the first communications node determines data scheduling adjustment information according to the maximum processing capability information of the data node and the information about the requirement, for the processing capability of the data node, indicated by the total result of performing data scheduling by the first communications node and the second communications node on the data node; and the first communications node determines the data scheduling information according to the data scheduling adjustment information and information about a requirement for performing data transmission between the first communications node and the data node (the requirement information may include channel condition information, service load information, and the like).

In this implementation manner, a quantity of second communications nodes may not be limited, the first communications node and the second communications node may be considered as all communications nodes that serve the data node; that is, the data node notifies the first communications node of a processing capability C' that is of the data node and that is required by a total result of performing data scheduling by all current communications nodes on the data node.

The first communications node compares the received processing capability C' of the data node with the maximum processing capability C of the data node. If C'>C, when data scheduling is subsequently performed on the data node, it is ensured that an upper limit of a processing capability that is of the data node and that is required by a result of performing data scheduling on the data node is decreased by C'−C. If C'<C, when data scheduling is subsequently performed on the data node, an upper limit of a processing capability that is of the data node and that is required by a result of performing data scheduling on the data node is increased by C−C'.

Alternatively, if C'>C, when subsequently performing data scheduling on the data node, the first communications node ensures that an upper limit of a processing capability that is of the data node and that is required by a result of performing data scheduling on the data node is decreased by $n*(C'-C)$, where $n<1$, and in addition, the first communications node instructs the second communications node to ensure that the upper limit of the processing capability that is of the data node and that is required by the result of performing data scheduling on the data node is decreased by $(1-n)*(C'-C)$ when subsequently performing data scheduling on the data node. If C'<C, when subsequently performing data scheduling on the data node, the first communications node increases, by $n*(C-C')$, an upper limit of a processing capability that is of the data node and that is required by a result of performing data scheduling on the data node, and in addition, the first communications node instructs the second communications node to increase, by $(1-n)*(C'-C)$, the upper limit of the processing capability that is of the data node and that is required by the result of performing data scheduling on the data node when subsequently performing data scheduling on the data node.

Optionally, when in addition to the first communications node, N communications nodes that include the second communications node and that serve the data node further exist, if C'>C, when subsequently performing data scheduling on the data node, the first communications node ensures that an upper limit of a processing capability that is of the data node and that is required by a result of performing data scheduling on the data node is decreased by $n*(C'-C)$, where $n<1$, and in addition, the first communications node instructs some or all nodes in the N communications nodes to decrease the upper limit of the processing capability that is of the data node and that is required by the result of performing data scheduling on the data node when subsequently performing data scheduling on the data node, so that the upper limit of the processing capability that is of the data node and that is required by the result of performing data scheduling on the data node is decreased by at least $(1-n)*(C'-C)$ in total; or if C'<C, when subsequently performing data scheduling on the data node, the first communications node increases, by $n*(C'-C)$, an upper limit of a processing capability that is of the data node and that is required by a result of performing data scheduling on the data node, where $n<1$, and in addition, the first communications node instructs some or all nodes in the N communications nodes to increase, by a specific amount, the upper limit of the processing capability that is of the data node and that is required by the result of performing data scheduling on the data node when subsequently performing data scheduling on the data node, so that the upper limit of the processing capability that is of the data node and that is required by the result of performing data scheduling on the data node may be increased by $(1-n)*(C'-C)$ in total.

In this embodiment of the present invention, the first communications node may adjust, in a timely manner according to the information that is fed back by the data node in real time and that is about the requirement, for the processing capability of the data node, indicated by the total result of performing data scheduling by the first communications node and the second communications node on the data node, a requirement for an upper limit of a processing capability of the data node when data scheduling is subsequently performed on the data node, so that a result of subsequent data scheduling performed by the first communications node on the data node ensures full use of the processing capability of the data node, and a case in which the total result of performing data scheduling by the first communications node and the second communications node on the data node is beyond the range supported by the processing capability of the data node is also avoided. Compared with a manner in which the processing capability of the data node is preconfigured, this implementation manner may improve a throughput of the data node and a peak rate.

In this embodiment of the present invention, the data node notifies the first communications node of information about a requirement, for a processing capability of the data node, indicated by a total result of performing data scheduling by all communications nodes on the data node. In specific implementation, alternatively, the second communications node may notify, by using an IE (information element) predefined between the second communications node and the first communications node, the first communications node of the requirement information. Then, the first communications node obtains, according to information about a requirement of the first communications node for a capability of user equipment and information about a requirement of the second communications node for a capability of the user equipment, the information about the requirement, for the processing capability of the data node, indicated by the total result of performing data scheduling by all the communications nodes on the data node. However, because of non-ideal backhaul existing in data transmission between communications nodes, a transmission delay exists when the second communications node transmits data to the first communications node, and the result of performing data scheduling by the second communications node on the data node dynamically changes. Therefore, a manner in which communications nodes notify each other cannot meet a requirement for real-time transmission of information.

Form 5: The scheduling limitation indication information includes information about a relationship between the maximum processing capability information of the data node and information about a requirement, for a processing capability of the data node, indicated by a total result of performing data scheduling by the first communications node and the second communications node on the data node.

In this implementation manner, the data node determines, according to the data scheduling information sent by the first communications node and the second communications node, information about a total requirement for a processing capability of the data node when data transmission is performed between the data node and either of the first communications node and the second communications node, and determines information about a relationship between the total requirement information and the maximum processing capability of the data node. For example, the relationship information may be specifically information about a remaining processing capability of the data node, or information about processing capability which exceeds the maximum processing capability of the data node. After the data node sends the relationship information to the first communications node, the first communications node may directly determine scheduling adjustment information according to the relationship information, and determine the data scheduling information according to the data scheduling adjustment information and information about a requirement for performing data transmission between the first communications node and the data node (the requirement information may include channel condition information, service load information, and the like). For a process in which the first communications node performs subsequent data scheduling adjustment according to the relationship information, refer to specific implementation of the foregoing fourth implementation manner. Details are not described herein again.

In a specific implementation process, alternatively, the foregoing relationship information may be information that represents whether a processing capability that is of the data node and that is required by a total result of performing data scheduling by the first communications node and the second communications node on the data node is greater than or less than the maximum processing capability of the data node. For example, 1-bit information may be used to identify the relationship information. Specifically, 1 may be used to represent that the processing capability that is of the data node and that is required by the total result of performing data scheduling by the first communications node and the second communications node on the data node is greater than the maximum processing capability of the data node, and 0 is used to represent that the processing capability that is of the data node and that is required by the total result of performing data scheduling by the first communications node and the second communications node on the data node is less than the maximum processing capability of the data node. After receiving the relationship information, the first communications node may adjust a result of subsequently performing data scheduling on the data node. However, because an adjusted quantized value cannot be determined, a "training" process is required in an adjustment process. For example, after receiving information that indicates a relationship that the processing capability that is of the data node and that is required by the total result of performing data scheduling by the first communications node and the second communications node on the data node is greater than the maximum processing capability C of the data node, the first communications node may gradually decrease, by $C/m$ ($m>1$), the processing capability that is of the data node and that is required by a result of subsequently performing data scheduling on the data node, until information that is sent by the data node and that indicates a relationship that the processing capability that is of the data node and that is required by the total result of performing data scheduling by the first communications node and the second communications node on the data node is less than the maximum processing capability C of the data node is received after the $N^{th}$ ($N>1$) adjustment. Then, a processing capability that is of the data node and that is required by a result of performing data scheduling on the data node after the $(N-1)^{th}$ adjustment is used as an upper limit value of a processing capability that is of the data node and that is required when data scheduling is subsequently performed on the data node.

Compared with the foregoing first to four implementation manners, in this implementation manner, an amount of information reported by the data node is relatively small, and a quantity of occupied channel resources is relatively small. However, compared with the other implementation manners, when the first communications node performs scheduling adjustment, an adjustment process is relatively complex.

Based on a same invention concept, the following embodiments of the present invention provide a data scheduling method based on a communications node side. A specific implementation process is similar to the foregoing embodiments, and no repeated description is provided.

Figure 7:
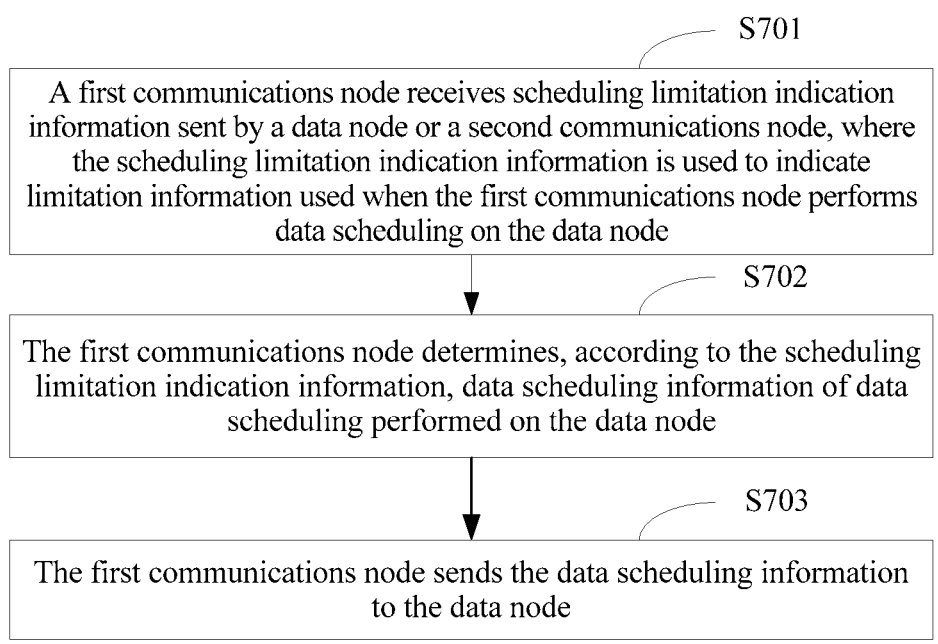
FIG. 7 is a flowchart of a data scheduling method according to Embodiment 6 of the present invention.

As shown in FIG. 7, FIG. 7 is a flowchart of a data scheduling method according to Embodiment 6 of the present invention. The method includes the following steps:

S701: A first communications node receives scheduling limitation indication information sent by a data node or a second communications node, where the scheduling limitation indication information is used to indicate limitation information used when the first communications node performs data scheduling on the data node.

S702: The first communications node determines, according to the scheduling limitation indication information, data scheduling information of data scheduling performed on the data node.

S703: The first communications node sends the data scheduling information to the data node.

Optionally, the receiving, by a first communications node, scheduling limitation indication information that is sent by the data node or a second communications node includes:

detecting, by the first communications node, on a channel resource that is preconfigured for the data node and that is used to send the scheduling limitation indication information, the scheduling limitation indication information sent by the data node or the second communications node; or detecting, by the first communications node, in a MAC CE preconfigured for the data node, the scheduling limitation indication information sent by the data node or the second communications node; or detecting, by the first communications node, the scheduling limitation indication information in an information element preconfigured for the first communications node and the second communications node.

Optionally, the scheduling limitation indication information includes indication information used to indicate one or more types of the following information:

a period of time within which the data node is in a sleep state relative to the second communications node;

information about a requirement, for a processing capability of the data node, indicated by a result of performing data scheduling by the second communications node on the data node;

information about a relationship between maximum processing capability information of the data node and the information about the requirement, for the processing capability of the data node, indicated by the result of performing data scheduling by the second communications node on the data node;

information about a requirement, for a processing capability of the data node, indicated by a total result of performing data scheduling by the first communications node and the second communications node on the data node; or information about a relationship between the maximum processing capability information of the data node and the information about the requirement, for the processing capability of the data node, indicated by the total result of performing data scheduling by the first communications node and the second communications node on the data node.

Optionally, the scheduling limitation indication information further includes identifier information used to indicate the second communications node.

Based on different received scheduling limitation indication information, the first communications node may determine the data scheduling information in one of the following manners.

Manner 1: If the scheduling limitation indication information includes the information about the period of time within which the data node is in the sleep state relative to the second communications node, the determining, by the first communications node according to the scheduling limitation indication information, data scheduling information of data scheduling performed on the data node includes:

determining, by the first communications node, the data scheduling information according to the information about the period of time within which the data node is in the sleep state relative to the second communications node, the maximum processing capability information of the data node, and information about a requirement for performing data transmission between the first communications node and the data node (the requirement information may include channel condition information, service load information, and the like).

In an embodiment, the indication information of the period of time within which the data node is in the sleep state relative to the second communications node includes first indication information, and the first indication information is used to indicate a time at which the data node switches from a non-sleep state to the sleep state relative to the second communications node; and the determining, by the first communications node, the data scheduling information according to the information about the period of time within which the data node is in the sleep state relative to the second communications node, the maximum processing capability information of the data node, and information about a requirement for performing data transmission between the first communications node and the data node includes:

determining, according to the first indication information, a start point of the period of time within which the data node is in the sleep state relative to the second communications node, and determining the data scheduling information according to the start point of the period of time within which the data node is in the sleep state relative to the second communications node, the maximum processing capability information of the data node, and the information about the requirement for performing data transmission between the first communications node and the data node.

In another embodiment, in addition to the first indication information, the indication information of the period of time within which the data node is in the sleep state relative to the second communications node further includes second indication information, and the second indication information is used to indicate a time at which the data node switches from the sleep state to the non-sleep state relative to the second communications node; and the determining, by the first communications node, the data scheduling information according to the information about the period of time within which the data node is in the sleep state relative to the second communications node, the maximum processing capability information of the data node, and information about a requirement for performing data transmission between the first communications node and the data node includes:

determining, according to the first indication information and the second indication information, an end point of the period of time within which the data node is in the sleep state relative to the second communications node, and determining the data scheduling information according to the end point of the period of time within which the data node is in the sleep state relative to the second communications node, the maximum processing capability information of the data node, and the information about the requirement for performing data transmission between the first communications node and the data node.

In another embodiment, in addition to the first indication information, the indication information of the period of time within which the data node is in the sleep state relative to the second communications node further includes third indication information, and the third indication information is used to indicate whether the data node is within a long DRX cycle or a short DRX cycle relative to the second communications node; and the determining, by the first communications node, the data scheduling information according to the information about the period of time within which the data node is in the sleep state relative to the second communications node, the maximum processing capability information of the data node, and information about a requirement for performing data transmission between the first communications node and the data node includes:

determining, according to the first indication information and the third indication information, an end point of the period of time within which the data node is in the sleep state relative to the second communications node, and determining the data scheduling information according to the end point of the period of time within which the data node is in the sleep state relative to the second communications node, the maximum processing capability information of the data node, and the information about the requirement for performing data transmission between the first communications node and the data node.

The following two manners in which the first communications node determines the data scheduling information according to the information about the period of time within which the data node is in the sleep state relative to the second communications node are corresponding to different manners in which the data node notifies the communications node of the period of time within which the data node is in the sleep state relative to the second communications node:

Manner 1: The first communications node determines, according to indication information of a state of the data node that is in the sleep state or the non-sleep state relative to the second communications node, a time at which the data node starts to switch from the non-sleep state to the sleep state relative to the second communications node and a time at which the data node starts to switch from the sleep state to the non-sleep state relative to the second communications node. A time period between the two time points is determined as a period of time within which the data node is in the sleep state relative to the second communications node.

Manner 2: The first communications node determines an end time point of each DRX cycle in the DRX cycle of the second communications node according to indication information of a moment at which the data node switches from the non-sleep state to the sleep state relative to the second communications node, the DRX cycle of the second communications node, and a start point offset parameter. A time period between the two time points is determined as a period of time within which the data node is in the sleep state relative to the second communications node.

If the second communications node configures two types of DRX cycles for the data node, the first communications node determines, according to received information used by the data node to indicate an end time of the current cycle, for example, information about whether a currently used DRX cycle is a long DRX cycle or a short DRX cycle, an end point of a period of time within which the data node is in the sleep state relative to the second communications node, and determines an end time point of the DRX cycle according to the received indication information of the moment at which the data node switches from the non-sleep state to the sleep state relative to the second communications node. A time period between the two time points is determined as a period of time within which the data node is in the sleep state relative to the second communications node.

Optionally, the scheduling limitation indication information further includes identifier information used to indicate the second communications node; and the method further includes: if the first communications node determines, according to the information used to indicate the identifier information, that in addition to the first communications node and the second communications node, at least one communications node that needs to perform data scheduling on the data node further exists, determining, by the first communications node according to the information about the period of time within which the data node is in the sleep state relative to the second communications node and the maximum processing capability information of the data node, information about a processing capability that can be supported by the data node if any communications node in the at least one communications node performs data scheduling on the data node; and sending, by the first communications node to the any communications node, the determined information that is used to indicate the processing capability that can be supported by the data node.

Manner 2: If the scheduling limitation indication information includes the information used to indicate the requirement, for the processing capability of the data node, indicated by the result of performing data scheduling by the second communications node on the data node, the determining, by the first communications node according to the scheduling limitation indication information, data scheduling information of data scheduling performed on the data node includes:

determining, by the first communications node according to the maximum processing capability information of the data node and the information about the requirement, for the processing capability of the data node, indicated by the result of performing data scheduling by the second communications node on the data node, information about a processing capability that can be supported by the data node if the first communications node performs data scheduling on the data node; and determining, by the first communications node, the data scheduling information according to the determined information about the processing capability that can be supported by the data node and information about a requirement for performing data transmission between the first communications node and the data node (the requirement information may include channel condition information, service load information, and the like).

Optionally, the scheduling limitation indication information further includes identifier information used to indicate the second communications node; and the method further includes: if the first communications node determines, according to the information used to indicate the identifier information, that in addition to the first communications node and the second communications node, at least one communications node that needs to perform data scheduling on the data node further exists, determining, by the first communications node according to the maximum processing capability information of the data node and the information about the requirement, for the processing capability of the data node, indicated by the result of performing data scheduling by the second communications node on the data node, information about a processing capability that can be supported by the data node if any communications node in the at least one communications node performs data scheduling on the data node; and sending, by the first communications node to the any communications node, the determined information that is used to indicate the processing capability that can be supported by the data node if the any communications node in the at least one communications node performs data scheduling on the data node.

Manner 3: If the scheduling limitation indication information includes the information used to indicate the relationship between the maximum processing capability information of the data node and the information about the requirement, for the processing capability of the data node, indicated by the result of performing data scheduling by the second communications node on the data node, the determining, by the first communications node according to the scheduling limitation indication information, data scheduling information of data scheduling performed on the data node includes:

determining, by the first communications node according to the relationship information, information about a processing capability that can be supported by the data node if the first communications node performs data scheduling on the data node; and determining, by the first communications node, the data scheduling information according to the determined information about the processing capability that can be supported by the data node and information about a requirement for performing data transmission between the first communications node and the data node (the requirement information may include channel condition information, service load information, and the like).

Optionally, the scheduling limitation indication information further includes identifier information used to indicate the second communications node; and the method further includes: if the first communications node determines, according to the information used to indicate the identifier information, that in addition to the first communications node and the second communications node, at least one communications node that needs to perform data scheduling on the data node further exists, determining, by the first communications node according to the relationship information, information about a processing capability that can be supported by the data node if any communications node in the at least one communications node performs data scheduling on the data node; and sending, by the first communications node to the any communications node, the determined information that is used to indicate the processing capability that can be supported by the data node if the any communications node in the at least one communications node performs data scheduling on the data node.

Manner 4: If the scheduling limitation indication information includes the information used to indicate the requirement, for the processing capability of the data node, indicated by the total result of performing data scheduling by the first communications node and the second communications node on the data node, the determining, by the first communications node according to the scheduling limitation indication information, data scheduling information of data scheduling performed on the data node includes:

determining, by the first communications node, data scheduling adjustment information according to the maximum processing capability information of the data node and the information about the requirement, for the processing capability of the data node, indicated by the total result of performing data scheduling by the first communications node and the second communications node on the data node; and determining, by the first communications node, the data scheduling information according to the data scheduling adjustment information and information about a requirement for performing data transmission between the first communications node and the data node (the requirement information may include channel condition information, service load information, and the like).

Optionally, the determining, by the first communications node, the data scheduling adjustment information includes:

determining, by the first communications node, the data scheduling adjustment information for each communications node that needs to perform data scheduling on the data node; and after the determining, by the first communications node, the data scheduling adjustment information, the method further includes:

for each communications node, except the first communications node, that needs to perform data scheduling on the data node, sending, by the first communications node, the determined data scheduling adjustment information that is used to indicate the communications node to the communications node.

Manner 5: If the scheduling limitation indication information includes the information used to indicate the relationship between the maximum processing capability information of the data node and the information about the requirement, for the processing capability of the data node, indicated by the total result of performing data scheduling by the first communications node and the second communications node on the data node, the determining, by the first communications node according to the scheduling limitation indication information, data scheduling information of data scheduling performed on the data node includes:

determining, by the first communications node, data scheduling adjustment information according to the relationship information; and determining, by the first communications node, the data scheduling information according to the data scheduling adjustment information and information about a requirement for performing data transmission between the first communications node and the data node (the requirement information may include channel condition information, service load information, and the like).

Optionally, the determining, by the first communications node, the data scheduling adjustment information includes:

determining, by the first communications node, the data scheduling adjustment information for each communications node that needs to perform data scheduling on the data node; and after the determining, by the first communications node, the data scheduling adjustment information, the method further includes:

for each communications node, except the first communications node, that needs to perform data scheduling on the data node, sending, by the first communications node, the determined data scheduling adjustment information that is used to indicate the communications node to the communications node.

It may be clearly understood by persons skilled in the art that, for the purpose of convenient and brief description, division of the foregoing function modules is taken as an example for illustration. In actual application, the foregoing functions can be allocated to different function modules and implemented according to a requirement; that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present application. The foregoing storage medium includes: any medium that can store program code, such as a Universal Serial Bus (USB) flash drive, a removable hard disk, a read-only memory (ROM), a random access memory (RAM), a magnetic disk, or an optical disc.

The foregoing embodiments are merely used to describe the technical solutions of the present application. The foregoing embodiments are merely intended to help understand the method and core idea of the present invention, and shall not be construed as a limitation on the present invention. Any variation or replacement readily figured out by persons skilled in the art within the technical scope disclosed in the present invention shall fall within the protection scope of the present invention. Additionally, statements made herein characterizing the invention refer to an embodiment of the invention and not necessarily all embodiments.

What is claimed is:

1. A data scheduling apparatus comprising:
a processor;
a memory that stores processor-executable instructions;
a bus; and
the processor is configured to communicate with the memory via the bus to execute the processor-executable instructions, wherein the processor-executable instructions, when executed, facilitate:
sending scheduling limitation indication information of a data node to a first communications node, wherein the scheduling limitation indication information includes identifier information corresponding to at least a second communications node and a processing capability requirement of the data node as a result of performing data scheduling by the second communication node on the data node;
receiving data scheduling information from the first communications node according to the scheduling limitation indication information;
wherein when the scheduling limitation indication information comprises information about a period of time within which the data node is in a sleep state relative to the second communications node,
the data scheduling information is determined according to information about (a) a period of time within which the data node is in the sleep state relative to the second communications node, (b) the maximum processing capability information of the data node, and (c) a requirement for performing data transmission between the first communications node and the data node; and
wherein when the scheduling limitation indication information comprises information about a third communications node needing to perform data scheduling on the data node,
the data scheduling information includes information about a processing capability that can be supported by the data node if the third communications node performs data scheduling on the data node according to the information about the period of time within which the data node is in the sleep state relative to the second communications node and the maximum processing capability information of the data node; and
sending uplink data to the first communications node or receiving downlink data from the first communications node, according to the data scheduling information.

2. The apparatus according to claim 1, wherein the scheduling limitation indication information further comprises one or more of the following:
a second processing capability requirement of the data node as a total result of performing data scheduling by the first communications node and the second communications node on the data node; and information on a relationship between the maximum processing capability information of the data node and the second processing capability requirement of the data node.

3. The apparatus according to claim 2, wherein the indication information which indicates the period of time within which the data node is in the sleep state relative to the second communications node comprises first indication information which indicates a time at which the data node switches from a non-sleep state to the sleep state relative to the second communications node.

4. The apparatus according to claim 3, wherein the indication information which indicates the period of time within which the data node is in the sleep state relative to the second communications node further comprises second indication information which indicates a time at which the data node switches from the sleep state to the non-sleep state relative to the second communications node.

5. The apparatus according to claim 3, wherein the indication information which indicates the period of time within which the data node is in the sleep state relative to the second communications node further comprises third indication information which indicates whether the data node is within a long discontinuous reception (DRX) cycle or a short DRX cycle relative to the second communications node.

6. The apparatus according to claim 1, wherein sending the scheduling limitation indication information to the first communications node further comprises:
after it is determined that a current scheduling limitation indication information changes, determining an updated scheduling limitation indication information; and
sending, according to a channel resource that is preconfigured by the first communications node for the data node and that is used to send the scheduling limitation indication information, the updated scheduling limitation indication information to the first communications node; or sending, by the data node, in a medium access control (MAC) control element (CE) preconfigured for the first communications node and the data node, the updated scheduling limitation indication information to the first communications node.

7. A data scheduling apparatus as a first communications node, the apparatus comprising:
a processor;
a memory storing processor-executable instructions;
a bus; and
the processor is configured to communicate with the memory via the bus to execute the processor-executable instructions, wherein the processor-executable instructions, when executed, facilitate:
receiving scheduling limitation indication information from a data node or a second communications node, wherein the scheduling limitation indication information includes an identifier information corresponding to the second communications node and a processing capability requirement of the data node as a result of performing data scheduling by the second communication node on the data node;
determining, according to the scheduling limitation indication information, data scheduling information for performing data scheduling on the data node,
wherein when the scheduling limitation indication information comprises information about a period of time within which the data node is in a sleep state relative to the second communications node, the data scheduling information is determined according to information about (a) a period of time within which the data node is in the sleep state relative to the second communications node, (b) the maximum processing capability information of the data node, and (c) a requirement for performing data transmission between the first communications node and the data node; and wherein when it is determined, according to the scheduling limitation indication information, that in addition to the first and second communications nodes, at least one other communications node exists that needs to perform data scheduling on the data node, determining information about a processing capability that can be supported by the data node if the at least one other communications node performs data scheduling on the data node according to the information about the period of time within which the data node is in the sleep state relative to the second communications node and the maximum processing capability information of the data node;

sending the data scheduling information to the data node and sending to the at least one other communications node the information about the processing capability that can be supported by the data node; and receiving uplink data from the data node or sending downlink data to the data node, according to the data scheduling information.

8. The apparatus according to claim 7, wherein the scheduling limitation indication information further comprises one or more of the following:

a second processing capability requirement of the data node as a total result of performing data scheduling by the first communications node and the second communications node on the data node; and information on a relationship between the maximum processing capability information of the data node and the second processing capability requirement of the data node.

9. The apparatus according to claim 7, wherein receiving the scheduling limitation indication information further comprises:

detecting, on a channel resource that is preconfigured for the data node and that is used to send the scheduling limitation indication information, the scheduling limitation indication information from the data node; or detecting, in a medium access control (MAC) control element (CE) predefined for the first communications node and the data node, the scheduling limitation indication information from the data node; or detecting, in an element preconfigured between the first communications node and the second communications node, the scheduling limitation indication information from the second communications node.

10. A data scheduling method comprising:

sending, by a data node, scheduling limitation indication information to a first communications node, wherein the scheduling limitation indication information includes identifier information corresponding to at least a second communications node and a processing capability requirement of the data node as a result of performing data scheduling by the second communication node on the data node;

receiving, by the data node, data scheduling information from the first communications node according to the scheduling limitation indication information, wherein when the scheduling limitation indication information comprises information about a period of time within which the data node is in a sleep state relative to the second communications node, the data scheduling information is determined according to information about (a) a period of time within which the data node is in the sleep state relative to the second communications node, (b) the maximum processing capability information of the data node, and (c) a requirement for performing data transmission between the first communications node and the data node; and wherein when the scheduling limitation indication information comprises information about a third communications node needing to perform data scheduling on the data node, the data scheduling information includes information about a processing capability that can be supported by the data node if the third communications node performs data scheduling on the data node according to the information about the period of time within which the data node is in the sleep state relative to the second communications node and the maximum processing capability information of the data node; and sending, by the data node according to the data scheduling information, uplink data to the first communications node, or receiving, by the data node according to the data scheduling information, downlink data from the first communications node.

11. The method according to claim 10, wherein the scheduling limitation indication information further comprises one or more of the following:

a second processing capability of the data node as a total result of performing data scheduling by the first communications node and the second communications node on the data node; and information on a relationship between the maximum processing capability information of the data node and the second processing capability of the data node.

12. The method according to claim 10, wherein the indication information which indicates the period of time within which the data node is in the sleep state relative to the second communications node comprises first indication information which indicates a time at which the data node switches from a non-sleep state to the sleep state relative to the second communications node.

13. The method according to claim 12, wherein the indication information which indicates the period of time within which the data node is in the sleep state relative to the second communications node further comprises second indication information, which indicates a time at which the data node switches from the sleep state to the non-sleep state relative to the second communications node.

14. The method according to claim 12, wherein the indication information which indicates the period of time within which the data node is in the sleep state relative to the second communications node further comprises third indication information which indicates whether the data node is within a long discontinuous reception (DRX) cycle or a short DRX cycle relative to the second communications node.

15. The method according to claim 10, wherein sending the scheduling limitation indication information to the first communications node further comprises:

after it is determined that a current scheduling limitation indication information changes, determining, by the data node, an updated scheduling limitation indication information; and sending, by the data node according to a channel resource that is preconfigured by the first communications node for the data node and that is used to send the scheduling limitation indication information, the updated scheduling limitation indication information to the first communications node; or sending, by the data node, in a medium access control (MAC) control element (CE) preconfigured for the first communications node and the data node, the updated scheduling limitation indication information to the first communications node.

* * * * *